(12) United States Patent
Ito et al.

(10) Patent No.: US 10,027,947 B2
(45) Date of Patent: Jul. 17, 2018

(54) IMAGE PROCESSING APPARATUS AND IMAGE PROCESSING METHOD

(71) Applicant: SONY CORPORATION, Tokyo (JP)

(72) Inventors: Katsuhisa Ito, Tokyo (JP); Kengo Hayasaka, Kanagawa (JP); Hironori Mori, Tokyo (JP)

(73) Assignee: SONY CORPORATION, Tokyo (JP)

( * ) Notice: Subject to any disclaimer, the term of this patent is extended or adjusted under 35 U.S.C. 154(b) by 280 days.

(21) Appl. No.: 14/893,754

(22) PCT Filed: May 23, 2014

(86) PCT No.: PCT/JP2014/063646
§ 371 (c)(1),
(2) Date: Nov. 24, 2015

(87) PCT Pub. No.: WO2014/196374
PCT Pub. Date: Dec. 11, 2014

(65) Prior Publication Data
US 2016/0105660 A1  Apr. 14, 2016

(30) Foreign Application Priority Data

Jun. 5, 2013  (JP) .................................. 2013-118852

(51) Int. Cl.
*H04N 13/00* (2018.01)
*H04N 13/02* (2006.01)
*G06T 7/00* (2017.01)

(52) U.S. Cl.
CPC ........... *H04N 13/0225* (2013.01); *G06T 7/97* (2017.01); *H04N 13/0011* (2013.01);
(Continued)

(58) Field of Classification Search
USPC ............................................... 348/42, 47–48
See application file for complete search history.

(56) References Cited

U.S. PATENT DOCUMENTS 6,094,501 A * 7/2000 Beatty .................. G06K 9/6203
382/104
2006/0219907 A1* 10/2006 Ogashiwa ............. H01J 37/222
250/310

(Continued)

FOREIGN PATENT DOCUMENTS

CN    101822068 A    9/2010
CN    101516040 B    7/2011

(Continued)

OTHER PUBLICATIONS

Jan. 18, 2017, CN communication issued for related CN application No. 201480030688.6.

(Continued)

*Primary Examiner* — Nigar Chowdhury
(74) *Attorney, Agent, or Firm* — Paratus Law Group, PLLC

(57) ABSTRACT

The present disclosure relates to an image processing apparatus and an image processing method that enable high-precision generation of parallax images of viewpoints with a small amount of calculation.
A correlation generating unit calculates correlation values of captured images of pairs of viewpoints, using captured images of viewpoints. A generating unit generates parallax images of different hierarchical levels of a reference viewpoint based on the correlation values. The parallax images are a parallax image formed with the disparity value of the reference viewpoint, and a parallax image formed with the disparity value of an occlusion region. The reference viewpoint is one of the viewpoints. The present disclosure can be applied to the image processing apparatus of a light field camera, for example.

9 Claims, 23 Drawing Sheets

(52) U.S. Cl.
CPC ..... *H04N 13/0203* (2013.01); *H04N 13/0282* (2013.01); *G06T 2200/21* (2013.01); *G06T 2207/10052* (2013.01); *H04N 13/0242* (2013.01); *H04N 2013/0081* (2013.01)

(56) References Cited

U.S. PATENT DOCUMENTS

| | | | |
|---|---|---|---|
| 2007/0189396 A1* | 8/2007 | Kitahara | H04N 19/597 375/240.26 |
| 2009/0028248 A1* | 1/2009 | Kitahara | H04N 13/0018 375/240.26 |
| 2010/0021072 A1* | 1/2010 | Shimizu | H04N 19/527 382/233 |
| 2010/0215251 A1 | 8/2010 | Klein Gunnewiek et al. | |
| 2011/0157350 A1 | 6/2011 | Yamamoto | |
| 2011/0211042 A1* | 9/2011 | Thorpe | H04N 13/0003 348/43 |
| 2012/0113235 A1* | 5/2012 | Shintani | H04N 13/0022 348/51 |
| 2012/0147205 A1* | 6/2012 | Lelescu | H04N 13/0029 348/218.1 |
| 2013/0120540 A1* | 5/2013 | Ishii | H04N 13/0214 348/49 |
| 2013/0135449 A1* | 5/2013 | Horii | G03B 35/10 348/49 |

FOREIGN PATENT DOCUMENTS

| | | |
|---|---|---|
| CN | 102156976 A | 8/2011 |
| JP | 2000-215311 | 8/2000 |
| JP | 2011-501496 | 1/2011 |
| JP | 4706882 B2 | 3/2011 |
| JP | 2013-030848 | 2/2013 |

OTHER PUBLICATIONS

Sep. 29, 2016, CN communication issued for related CN application No. 201480030688.6.

* cited by examiner

FIG. 10

IMAGE PROCESSING APPARATUS AND IMAGE PROCESSING METHOD

CROSS REFERENCE TO PRIOR APPLICATION

This application is a National Stage Patent Application of PCT International Patent Application No. PCT/JP2014/063646 (filed on May 23, 2014) under 35 U.S.C. § 371, which claims priority to Japanese Patent Application No. 2013-118852 (filed on Jun. 5, 2013), which are all hereby incorporated by reference in their entirety.

TECHNICAL FIELD

The present disclosure relates to image processing apparatuses and image processing methods, and more particularly, to an image processing apparatus and an image processing method that enable high-precision generation of parallax images of different viewpoints with a small amount of calculation.

BACKGROUND ART

Imaging apparatuses called light field cameras and the like are drawing attention these days. Such an imaging apparatus obtains captured images of viewpoints through imaging units, generates a captured image of a virtual viewpoint from the captured images (view interpolation), and generates a captured image of a virtual focus or the like using these captured images (see Patent Document 1, for example).

Such an imaging apparatus generates an image of a virtual viewpoint by generating the parallax images (depth maps) corresponding to captured images of viewpoints, generating a captured image of the virtual viewpoint from the captured images using the parallax images for the respective viewpoints (image registration), and combining the captured images. Therefore, to generate a high-precision captured image of the virtual viewpoint, it is necessary to generate the parallax images with high precision. It should be noted that a parallax image is an image having pixel values that are the disparity values of the respective pixels in a captured image. Here, an image of an object located on the farther side has a smaller disparity value, and an image of an object located on the nearer side has a larger disparity value.

CITATION LIST

Patent Document

Patent Document 1: JP 4706882 B2

SUMMARY OF THE INVENTION

Problems to be Solved by the Invention

The method of generating the parallax images of the viewpoints may be a method of generating parallax images from a captured image of a reference viewpoint that is the single viewpoint to serve as the reference, and estimating, from the generated parallax images, the parallax images of the viewpoints other than the reference viewpoint.

By this method, however, when occlusion occurs in the captured image of the reference viewpoint, for example, the disparity value of the occlusion region of the reference viewpoint is not accurately estimated, and the parallax images of viewpoints other than the reference viewpoint are not generated with high precision. It should be noted that, in this specification, the occlusion region of the reference viewpoint means the region that cannot be seen from the reference viewpoint but can be seen from viewpoints other than the reference viewpoint.

Alternatively, the method of generating the parallax images of the viewpoints may be a method of generating a parallax image from a captured image for each viewpoint. By this method, high-precision parallax images can be generated, but an enormous amount of calculation is required.

The present disclosure is made in view of those circumstances, and is to enable high-precision generation of parallax images of different viewpoints with a small amount of calculation.

Solutions to Problems

An image processing apparatus of a first aspect of the present disclosure is an image processing apparatus that includes: a calculating unit that calculates correlation values of captured images of pairs of viewpoints, using captured images of the viewpoints; and a generating unit that generates parallax images of different hierarchical levels of a reference viewpoint based on the correlation values calculated by the calculating unit, the parallax images being a viewpoint parallax image formed with the disparity value of the reference viewpoint and an occlusion parallax image formed with the disparity value of an occlusion region, the reference viewpoint being one of the viewpoints.

An image processing method of the first aspect of the present disclosure is compatible with the image processing apparatus of the first aspect of the present disclosure.

In the first aspect of the present disclosure, correlation values of captured images of pairs of viewpoints are calculated with the use of captured images of the viewpoints, and, based on the correlation values, a viewpoint parallax image formed with the disparity value of a reference viewpoint and an occlusion parallax image formed with the disparity value of an occlusion region are generated as the parallax images of different hierarchical levels of the reference viewpoint that is one of the viewpoints.

An image processing apparatus of a second aspect of the present disclosure is an image processing apparatus that includes: a calculating unit that calculates correlation values of captured images of pairs of viewpoints, using captured images of the viewpoints; and a generating unit that generates a viewpoint parallax image based on a table associating a pattern of the correlation values of the respective pairs with a predetermined pair among the pairs of viewpoints, the viewpoint parallax image being generated from the highest correlation disparity value as the disparity value corresponding to the highest correlation value of the predetermined pair, the viewpoint parallax image being formed with the disparity value of a reference viewpoint that is one of the viewpoints.

An image processing method of the second aspect of the present disclosure is compatible with the image processing apparatus of the second aspect of the present disclosure.

In the second aspect of the present disclosure, correlation values of captured images of pairs of viewpoints are calculated with the use of captured images of the viewpoints; and a viewpoint parallax image formed with the disparity value of a reference viewpoint that is one of the viewpoints is generated based on a table associating a pattern of the correlation values of the respective pairs with a predetermined pair among the pairs of viewpoints, the viewpoint parallax image being generated from the highest correlation disparity value as the disparity value corresponding to the highest correlation value of the predetermined pair.

The image processing apparatuses of the first and second aspects of the present disclosure can also be realized by causing a computer to execute a program.

Also, to realize the image processing apparatuses of the first and second aspects of the present disclosure, the program to be executed by a computer may be transmitted and provided via a transmission medium, or the program recorded on a recording medium may be provided.

Effects of the Invention

According to the present disclosure, high-precision parallax images of different viewpoints can be generated with a small amount of calculation.

BRIEF DESCRIPTION OF DRAWINGS

FIG. 10 is a diagram showing an example of the hierarchical table.

MODES FOR CARRYING OUT THE INVENTION

<Embodiment>
(Example Structure of an Embodiment of an Imaging Apparatus)

Figure 1:
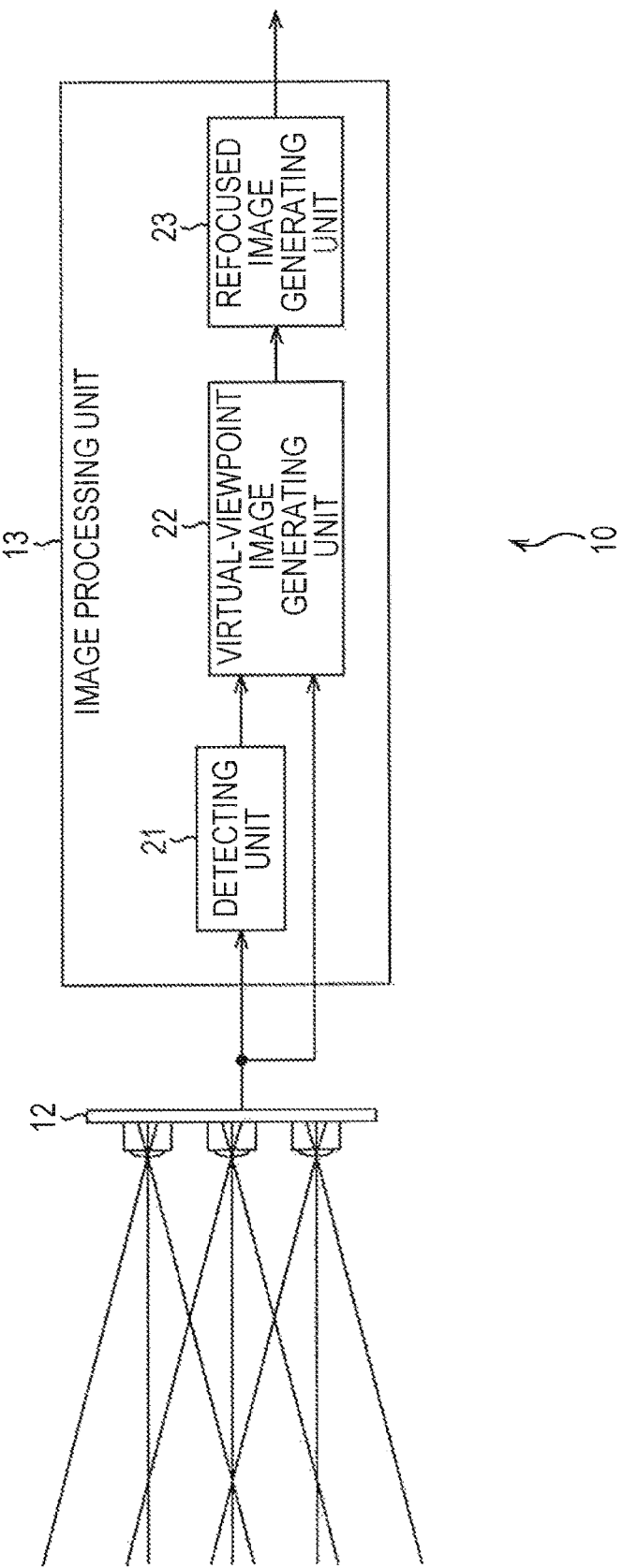
FIG. 1 is a block diagram showing an example structure of an embodiment of an imaging apparatus as an image processing apparatus to which the present disclosure is applied.

FIG. 1 is a block diagram showing an example structure of an embodiment of an imaging apparatus as an image processing apparatus to which the present disclosure is applied.

The imaging apparatus 10 shown in FIG. 1 includes an imaging array 12 and an image processing unit 13. The imaging apparatus 10 obtains captured images of different viewpoints, and generates a captured image of a virtual focus as a refocused image.

Specifically, the imaging array 12 of the imaging apparatus 10 is formed by two-dimensionally arranging imaging units each including an imaging lens, an imaging device such as a CCD (Charge Coupled Device) or a CMOS (Complementary Metal-Oxide Semiconductor), and an A/D converter.

Each imaging unit of the imaging array 12 receives incoming light from an object with the imaging device via the imaging lens, and acquires a captured image by performing A/D conversion with the A/D converter on the analog signal obtained as a result of the light reception. In this manner, the imaging array 12 obtains captured images of different viewpoints with the respective imaging units. The imaging array 12 supplies the obtained captured images of the respective viewpoints to the image processing unit 13.

The image processing unit 13 is formed with an LSI (Large Scale Integration), for example. The image processing unit 13 includes a detecting unit 21, a virtual-viewpoint image generating unit 22, and a refocused image generating unit 23.

The detecting unit 21 detects disparity values based not only on a correlation value between a captured image of a reference viewpoint supplied from the imaging array 12 and a captured image of a viewpoint other than the reference viewpoint, but also on a correlation value between captured images of viewpoints other than the reference viewpoint. As a result, the disparity value of the reference viewpoint and the disparity value of the occlusion region of the reference viewpoint are detected. For ease of explanation, there is only one occlusion region of the reference viewpoint in this embodiment.

The detecting unit 21 generates the parallax images of two hierarchical levels of the reference viewpoint by setting a parallax image formed with the disparity value of the reference viewpoint as the parallax image (viewpoint parallax image) of a first hierarchical level, and setting a parallax image formed with the disparity value of the occlusion region of the reference viewpoint as the parallax image (occlusion parallax image) of a second hierarchical level. The detecting unit 21 then supplies the parallax images of the two hierarchical levels of the reference viewpoint to the virtual-viewpoint image generating unit 22.

The virtual-viewpoint image generating unit 22 stores the parallax images of the two hierarchical levels of the reference viewpoint supplied from the detecting unit 21. Using the stored parallax images of the two hierarchical levels of the reference viewpoint, the virtual-viewpoint image generating unit 22 generates parallax images of viewpoints other than the reference viewpoint.

Using the stored parallax images of the respective viewpoints and the captured images of the respective viewpoints supplied from the imaging array 12, the virtual-viewpoint image generating unit 22 generates a captured image of a virtual viewpoint other than the viewpoints corresponding to the imaging units. The virtual-viewpoint image generating unit 22 supplies the captured images of the respective viewpoints supplied from the imaging array 12 and the captured image of the virtual viewpoint as an ultra-multiview image to the refocused image generating unit 23.

The refocused image generating unit 23 functions as a virtual-focus image generating unit, and generates a captured image of a virtual focus as a refocused image, using the ultra-multiview image supplied from the virtual-viewpoint image generating unit 22. The refocused image generating unit 23 outputs the generated refocused image.

(Example Structure of the Imaging Array)

Figure 2:
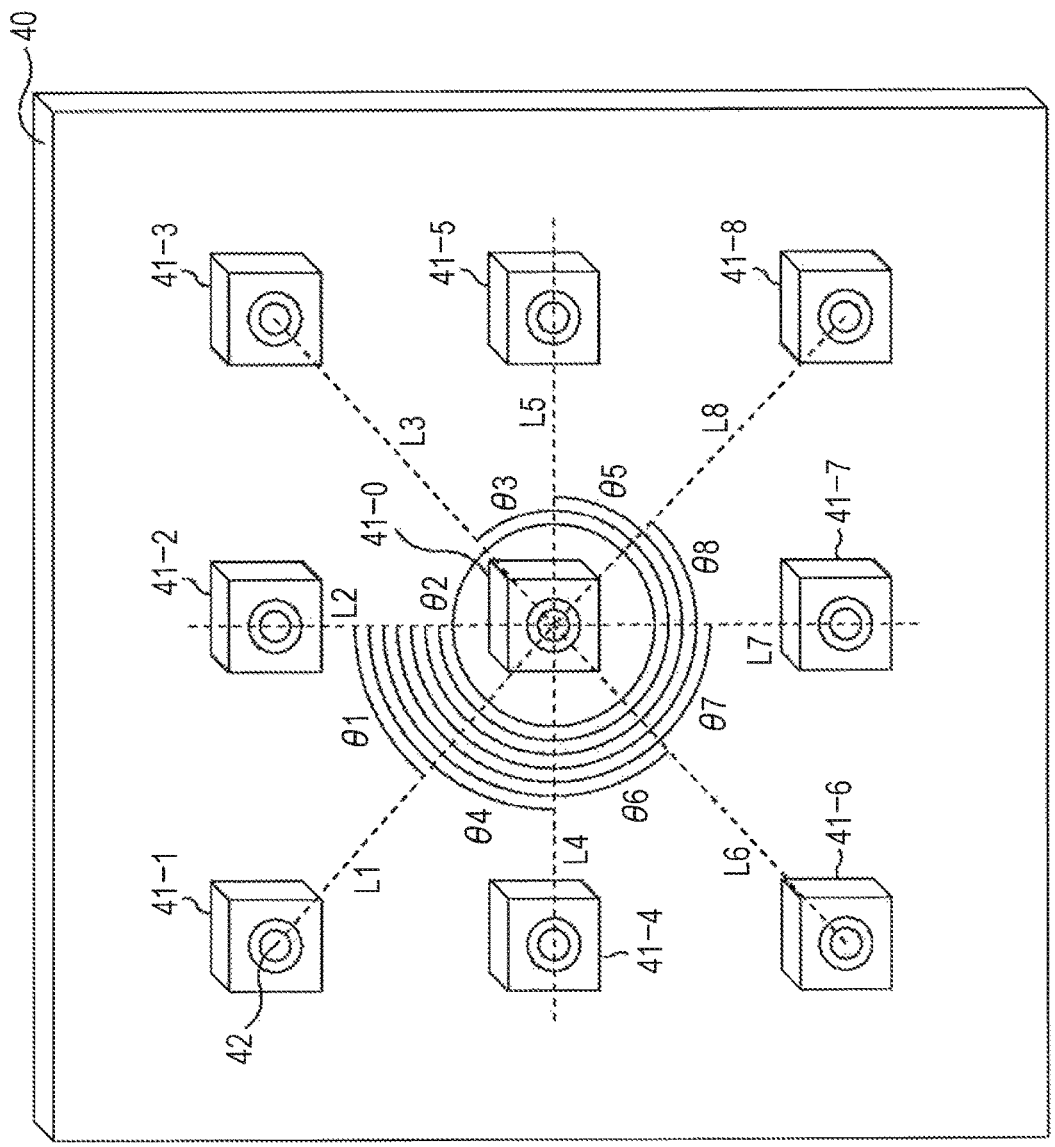
FIG. 2 is a perspective view of an example structure of the imaging array.

FIG. 2 is a diagram showing an example structure of the imaging array 12 shown in FIG. 1, and is a perspective view of the imaging array 12 as seen from the object side.

In the imaging array 12 shown in FIG. 2, nine imaging units 41-0 through 41-8 are arranged on a flat board surface 40 of a base having a low ratio of thermal expansion and contraction, with three imaging units of the nine imaging units 41-0 through 41-8 being arranged in each row and each column at regular intervals. As shown in FIG. 2, each of the imaging units 41-0 through 41-8 includes an imaging lens 42. In this embodiment, the viewpoint corresponding to the imaging unit 41-0 is set as the reference viewpoint.

In the description below, the angles between the vertical straight line extending through the center of the imaging unit 41-0 corresponding to the reference viewpoint and the straight lines connecting the center of the imaging unit 41-0 to the respective centers of the imaging units 41-1 through 41-8 will be referred to as the angles 91 through 88. The angles 81 through 88 are 45 degrees, 360 degrees, 315 degrees, 90 degrees, 270 degrees, 135 degrees, 180 degrees, and 225 degrees, respectively.

The lengths of the straight lines connecting the center of the imaging unit 41-0 to the respective centers of the imaging units 41-1 through 41-8 will be referred to as the distances L1 through L8.

(Example Structure of the Detecting Unit)

Figure 3:
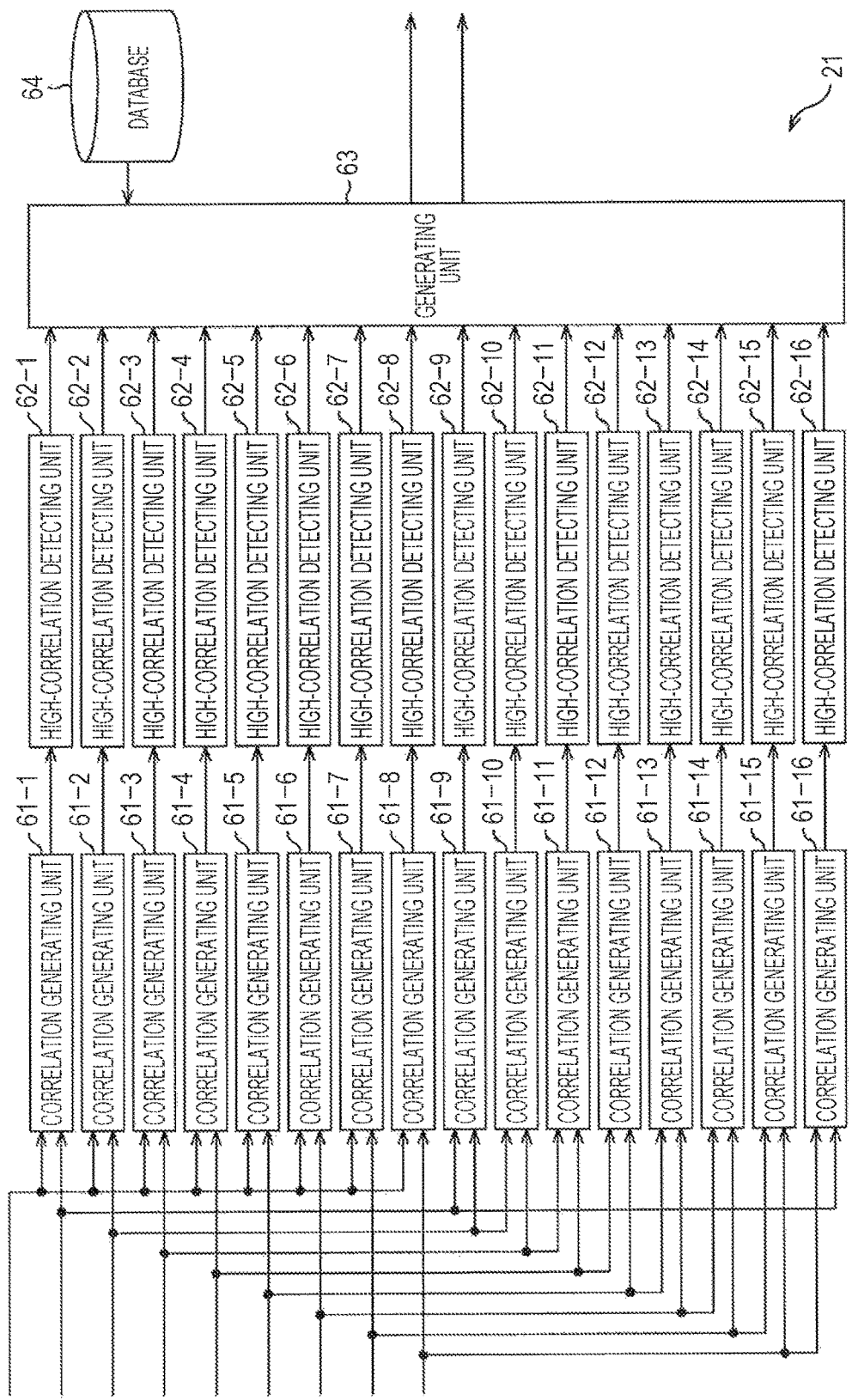
FIG. 3 is a block diagram showing an example structure of the detecting unit.

FIG. 3 is a block diagram showing an example structure of the detecting unit 21 shown in FIG. 1.

As shown in FIG. 3, the detecting unit 21 includes correlation generating units 61-1 through 61-16, high-correlation detecting units 62-1 through 62-16, a generating unit 63, and a database 64.

The correlation generating unit 61-1 obtains the captured image of the reference viewpoint supplied from the imaging unit 41-0, and the captured image supplied from the imaging unit 41-2. The correlation generating unit 61-1 first selects the pixel area at the upper left corner of the captured image of the reference viewpoint as the current pixel area, and then shifts the current pixel area one pixel at a time in the raster scanning direction. The pixel areas may be formed in a desired shape.

The correlation generating unit 61-1 functions as a calculating unit, detects a correlation between the current pixel area and the reference pixel area corresponding to the current pixel area in the captured image supplied from the imaging unit 41-2, and obtains a correlation value as a result of the correlation detection. The method of detecting a correlation may be a method of detecting a correlation value from a phase difference such as a block matching method, or a method of detecting a correlation value from a contrast obtained as a result of combining of the current pixel area and the reference pixel area, for example.

The correlation generating unit 61-1 also generates a disparity value based on the distance between the current pixel area and the reference pixel area. The correlation generating unit 61-1 then supplies correlation value information indicating the relationship between the disparity value of the current pixel area and the correlation value corresponding to the disparity value, to the high-correlation detecting unit 62-1.

The correlation generating unit 61-2 obtains the captured image of the reference viewpoint supplied from the imaging unit 41-0, and the captured image supplied from the imaging unit 41-1. The correlation generating unit 61-2 performs correlation detection in the same manner as the correlation generating unit 61-1, and supplies correlation value information to the high-correlation detecting unit 62-2.

The correlation generating unit 61-3 obtains the captured image of the reference viewpoint supplied from the imaging unit 41-0, and the captured image supplied from the imaging unit 41-4. The correlation generating unit 61-3 performs correlation detection in the same manner as the correlation generating unit 61-1, and supplies correlation value information to the high-correlation detecting unit 62-3.

The correlation generating unit 61-4 obtains the captured image of the reference viewpoint supplied from the imaging unit 41-0, and the captured image supplied from the imaging unit 41-6. The correlation generating unit 61-4 performs correlation detection in the same manner as the correlation generating unit 61-1, and supplies correlation value information to the high-correlation detecting unit 62-4.

The correlation generating unit 61-5 obtains the captured image of the reference viewpoint supplied from the imaging unit 41-0, and the captured image supplied from the imaging unit 41-7. The correlation generating unit 61-5 performs correlation detection in the same manner as the correlation generating unit 61-1, and supplies correlation value information to the high-correlation detecting unit 62-5.

The correlation generating unit 61-6 obtains the captured image of the reference viewpoint supplied from the imaging unit 41-0, and the captured image supplied from the imaging unit 41-8. The correlation generating unit 61-6 performs correlation detection in the same manner as the correlation generating unit 61-1, and supplies correlation value information to the high-correlation detecting unit 62-6.

The correlation generating unit 61-7 obtains the captured image of the reference viewpoint supplied from the imaging unit 41-0, and the captured image supplied from the imaging unit 41-5. The correlation generating unit 61-7 performs correlation detection in the same manner as the correlation generating unit 61-1, and supplies correlation value information to the high-correlation detecting unit 62-7.

The correlation generating unit 61-8 obtains the captured image of the reference viewpoint supplied from the imaging unit 41-0, and the captured image supplied from the imaging unit 41-3. The correlation generating unit 61-8 performs correlation detection in the same manner as the correlation generating unit 61-1, and supplies correlation value information to the high-correlation detecting unit 62-8.

In the above manner, the correlation generating units 61-1 through 61-8 generate the correlation value information about the captured image of the reference viewpoint and the captured images of viewpoints other than the reference viewpoint. Thus, the disparity value of the reference viewpoint can be detected from this correlation value information.

The correlation generating unit 61-9 obtains the captured image supplied from the imaging unit 41-2, and the captured image supplied from the imaging unit 41-1 adjacent to the imaging unit 41-2. The correlation generating unit 61-9 then determines the current pixel area in the same manner as the correlation generating unit 61-1.

The correlation generating unit 61-9 also detects a correlation between the pixel area corresponding to the current pixel area in the captured image supplied from the imaging unit 41-2 and the reference pixel area corresponding to the current pixel area in the captured image supplied from the imaging unit 41-1, and obtains a correlation value as a result of the correlation detection. The correlation generating unit 61-9 also generates a disparity value based on the distance between the pixel area corresponding to the current pixel area and the reference pixel area. The correlation generating unit 61-9 then supplies correlation value information to the high-correlation detecting unit 62-9.

The correlation generating unit 61-10 obtains the captured image supplied from the imaging unit 41-1, and the captured image supplied from the imaging unit 41-4 adjacent to the imaging unit 41-1. The correlation generating unit 61-10 performs correlation detection in the same manner as the correlation generating unit 61-9, and supplies correlation value information to the high-correlation detecting unit 62-10.

The correlation generating unit 61-11 obtains the captured image supplied from the imaging unit 41-4, and the captured image supplied from the imaging unit 41-6 adjacent to the imaging unit 41-4. The correlation generating unit 61-11 performs correlation detection in the same manner as the correlation generating unit 61-9, and supplies correlation value information to the high-correlation detecting unit 62-11.

The correlation generating unit 61-12 obtains the captured image supplied from the imaging unit 41-6, and the captured image supplied from the imaging unit 41-7 adjacent to the imaging unit 41-6. The correlation generating unit 61-12 performs correlation detection in the same manner as the correlation generating unit 61-9, and supplies correlation value information to the high-correlation detecting unit 62-12.

The correlation generating unit 61-13 obtains the captured image supplied from the imaging unit 41-7, and the captured image supplied from the imaging unit 41-8 adjacent to the imaging unit 41-7. The correlation generating unit 61-13 performs correlation detection in the same manner as the correlation generating unit 61-9, and supplies correlation value information to the high-correlation detecting unit 62-13.

The correlation generating unit 61-14 obtains the captured image supplied from the imaging unit 41-8, and the captured image supplied from the imaging unit 41-5 adjacent to the imaging unit 41-8. The correlation generating unit 61-14 performs correlation detection in the same manner as the correlation generating unit 61-9, and supplies correlation value information to the high-correlation detecting unit 62-14.

The correlation generating unit 61-15 obtains the captured image supplied from the imaging unit 41-5, and the captured image supplied from the imaging unit 41-3 adjacent to the imaging unit 41-5. The correlation generating unit 61-15 performs correlation detection in the same manner as the correlation generating unit 61-9, and supplies correlation value information to the high-correlation detecting unit 62-15.

The correlation generating unit 61-16 obtains the captured image supplied from the imaging unit 41-3, and the captured image supplied from the imaging unit 41-2 adjacent to the imaging unit 41-3. The correlation generating unit 61-16 performs correlation detection in the same manner as the correlation generating unit 61-9, and supplies correlation value information to the high-correlation detecting unit 62-16.

In the above manner, the correlation generating units 61-9 through 61-16 generate the correlation value information among the captured images of viewpoints other than the reference viewpoint. Thus, the disparity value of the occlusion region of the reference viewpoint can be detected from this correlation value information.

The high-correlation detecting unit 62-1 detects the highest correlation value in the current pixel area based on the correlation value information about the current pixel area supplied from the correlation generating unit 61-1. If the highest correlation value in the current pixel area is equal to or higher than a threshold value, the high-correlation detecting unit 62-1 supplies the disparity value corresponding to the highest correlation value (this disparity value will be hereinafter referred to as the highest correlation disparity value) to the generating unit 63.

If the highest correlation value is smaller than the threshold value, on the other hand, the high-correlation detecting unit 62-1 supplies invalidity information indicating that the disparity value of the current pixel area is invalid, to the generating unit 63. It should be noted that the threshold value used here is the smallest correlation value at the time of the correlation detection performed on the same image, for example.

Like the high-correlation detecting unit 62-1, the high-correlation detecting units 62-2 through 62-16 supply the highest correlation disparity value or the invalidity information to the generating unit 63 based on the correlation value information supplied from the respective correlation generating units 61-2 through 61-16.

The generating unit 63 reads, from the database 64, a hierarchical table in which the disparity value patterns corresponding to the highest correlation values of the 16 viewpoint pairs corresponding to the correlation generating units 61-1 through 61-16 are associated with the pairs corresponding to the disparity values of the respective hierarchical levels. The generating unit 63 recognizes the pairs at the respective hierarchical levels based on the table and on the highest correlation disparity values or the invalidity information related to the current pixel areas supplied from the high-correlation detecting units 62-1 through 62-16.

The generating unit 63 calculates the mean value of the highest correlation disparity values of the recognized pairs at each hierarchical level, and stores the mean value as the disparity value of the current pixel area. The generating unit 63 then generates a parallax image by combining the disparity values of all the pixel areas at each hierarchical level, and supplies the parallax image to the virtual-viewpoint image generating unit 22.

The database 64 stores the hierarchical table.

In the description below, the correlation generating units 61-1 through 61-16 will be collectively referred to as the correlation generating unit 61 when there is no need to specifically distinguish them from one another. Likewise, the high-correlation detecting units 62-1 through 62-16 will be collectively referred to as the high-correlation detecting unit 62.

(Explanation of the Viewpoint Pairs Corresponding to the Correlation Generating Units)

Figure 4:
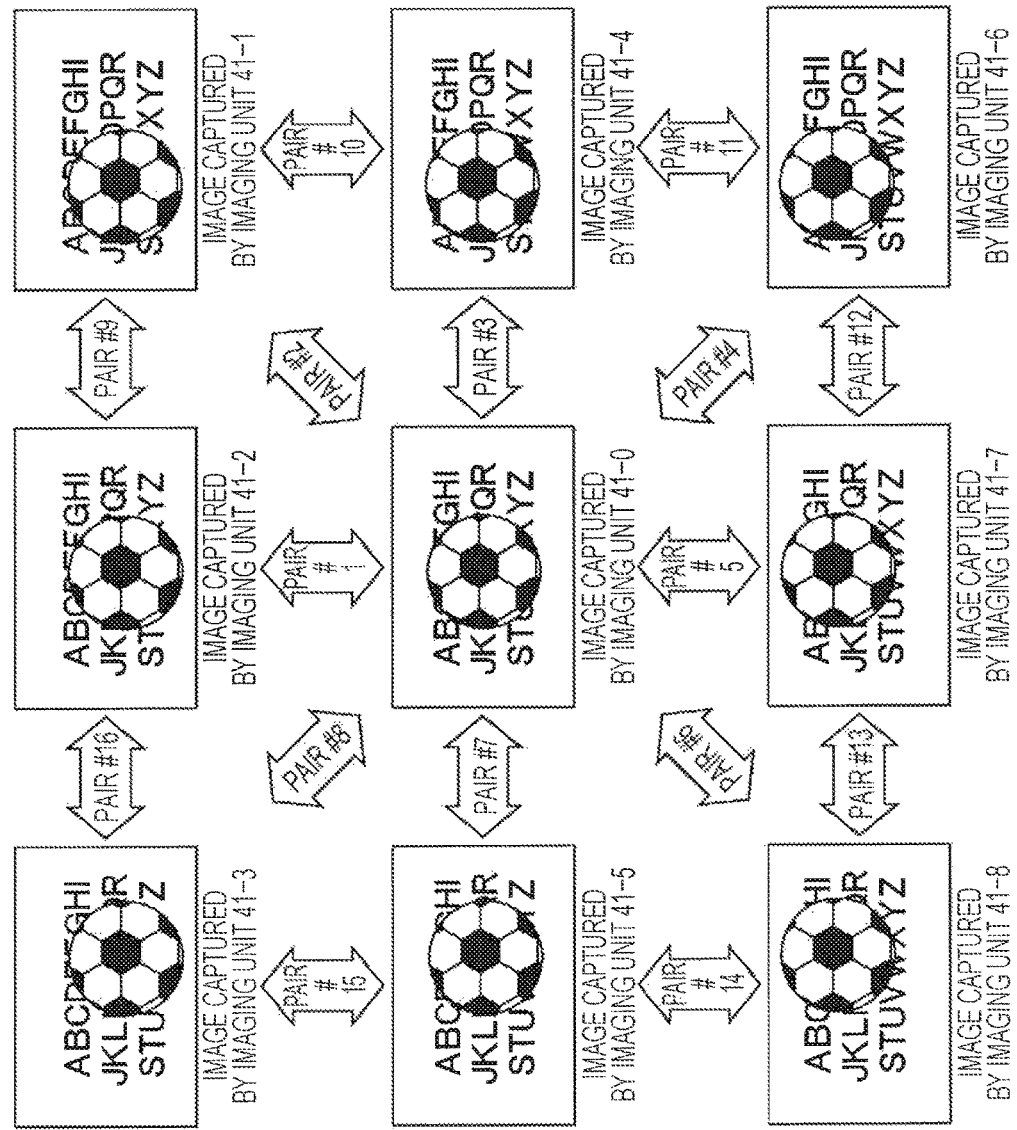
FIG. 4 is a diagram showing the 16 viewpoint pairs corresponding to the correlation generating units.

FIG. 4 is a diagram showing the 16 viewpoint pairs corresponding to the correlation generating units 61-1 through 61-16 shown in FIG. 3.

In the example illustrated in FIG. 4, the imaging apparatus 10 captures images of a background having the alphabets of A through Z written thereon, and a soccer ball existing in front of the background. The same applies to FIGS. 5 through 9 described later.

As shown in FIG. 4, the correlation generating unit 61-1 corresponds to the pair formed with the reference viewpoint corresponding to the imaging unit 41-0 and the viewpoint corresponding to the imaging unit 41-2 (this pair will be hereinafter referred to as the pair #1). The correlation generating unit 61-2 corresponds to the pair formed with the reference viewpoint and the viewpoint corresponding to the imaging unit 41-1 (this pair will be hereinafter referred to as the pair #2). The correlation generating unit 61-3 corresponds to the pair formed with the reference viewpoint and the viewpoint corresponding to the imaging unit 41-4 (this pair will be hereinafter referred to as the pair #3).

The correlation generating unit 61-4 corresponds to the pair formed with the reference viewpoint and the viewpoint corresponding to the imaging unit 41-6 (this pair will be hereinafter referred to as the pair #4). The correlation generating unit 61-5 corresponds to the pair formed with the reference viewpoint and the viewpoint corresponding to the imaging unit 41-7 (this pair will be hereinafter referred to as the pair #5). The correlation generating unit 61-6 corresponds to the pair formed with the reference viewpoint and the viewpoint corresponding to the imaging unit 41-8 (this pair will be hereinafter referred to as the pair #6).

The correlation generating unit 61-7 corresponds to the pair formed with the reference viewpoint and the viewpoint corresponding to the imaging unit 41-5 (this pair will be hereinafter referred to as the pair #7). The correlation generating unit 61-8 corresponds to the pair formed with the reference viewpoint and the viewpoint corresponding to the imaging unit 41-3 (this pair will be hereinafter referred to as the pair #8).

The correlation generating unit 61-9 corresponds to the pair formed with the viewpoint corresponding to the imaging unit 41-2 and the viewpoint corresponding to the imaging unit 41-1 (this pair will be hereinafter referred to as pair #9). The correlation generating unit 61-10 corresponds to the pair formed with the viewpoint corresponding to the imaging unit 41-1 and the viewpoint corresponding to the imaging unit 41-4 (this pair will be hereinafter referred to as the pair #10). The correlation generating unit 61-11 corresponds to the pair formed with the viewpoint corresponding to the imaging unit 41-4 and the viewpoint corresponding to the imaging unit 41-6 (this pair will be hereinafter referred to as the pair #11).

The correlation generating unit 61-12 corresponds to the pair formed with the viewpoint corresponding to the imaging unit 41-6 and the viewpoint corresponding to the imaging unit 41-7 (this pair will be hereinafter referred to as the pair #12). The correlation generating unit 61-13 corresponds to the pair formed with the viewpoint corresponding to the imaging unit 41-7 and the viewpoint corresponding to the imaging unit 41-8 (this pair will be hereinafter referred to as the pair #13). The correlation generating unit 61-14 corresponds to the pair formed with the viewpoint corresponding to the imaging unit 41-8 and the viewpoint corresponding to the imaging unit 41-5 (this pair will be hereinafter referred to as the pair #14).

The correlation generating unit 61-15 corresponds to the pair formed with the viewpoint corresponding to the imaging unit 41-5 and the viewpoint corresponding to the imaging unit 41-3 (this pair will be hereinafter referred to as the pair #15). The correlation generating unit 61-16 corresponds to the pair formed with the viewpoint corresponding to the imaging unit 41-3 and the viewpoint corresponding to the imaging unit 41-2 (this pair will be hereinafter referred to as the pair #16).

(Explanation of Correlation Detection)

Figure 5:
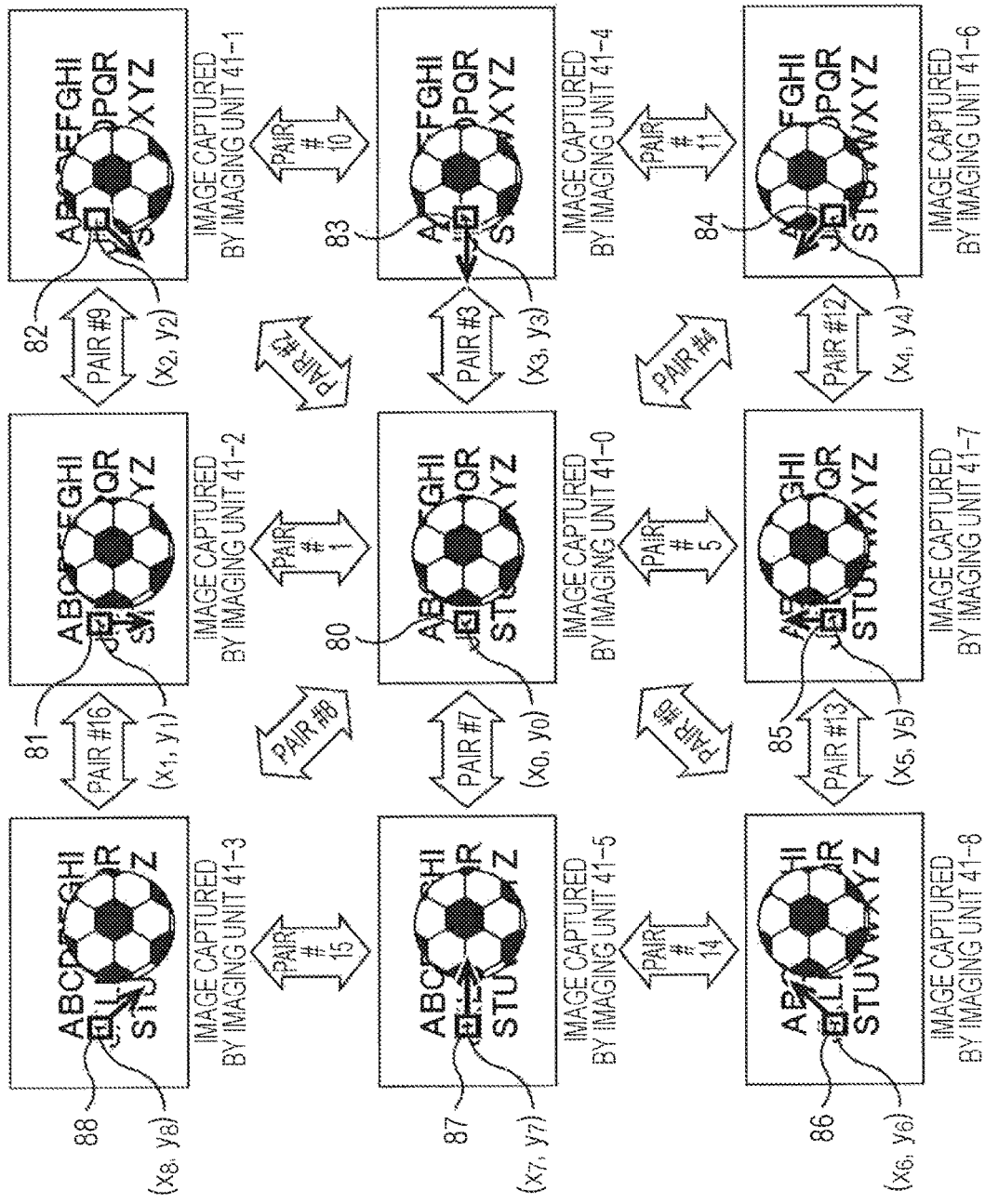
FIG. 5 is a diagram for explaining the correlation detection to be performed by the correlation generating units.

FIG. 5 is a diagram for explaining the correlation detection to be performed by the correlation generating unit 61.

As shown in FIG. 5, when a small pixel area 80 having its center at the coordinates $(x_0, y_0)$ of the captured image of the reference viewpoint is the current pixel area, for example, the correlation generating unit 61-1 determines the coordinates $(x_1, y_1)$ of the center of the reference pixel area 81 in the captured image supplied from the imaging unit 41-2 based on the coordinates $(x_0, y_0)$.

Specifically, with the coordinates $(x_0, y_0)$ being the initial values, the correlation generating unit 61-1 sequentially determines the coordinates $(x_1, y_1)$ to be the coordinates shifted by the amount equivalent to a short distance $\Delta d_2$ in the direction at an angle of $(\theta 2+180)$ degrees corresponding to the imaging unit 41-2, or the direction of the epipolar line. The correlation generating unit 61-1 then detects a correlation between the pixel area 80 and the reference pixel area 81.

The correlation generating units 61-2 through 61-8 perform correlation detection in the same manner as the correlation generating unit 61-1. That is, the correlation generating unit 61-$i$ ($i=2, 3, 4, 5, 6, 7, 8$) determines the coordinates $(x_i, y_i)$ of the center of the reference pixel area 8$i$ by shifting the coordinates $(x_i, y_u)$ by the small amount equivalent to the distance $\Delta d_j$ in the direction at an angle of $(\theta j+180)$ degrees ($j=1, 4, 6, 7, 8, 5, 3$), with the coordinates $(x_0, y_0)$ being the initial values. The correlation generating unit 61-$i$ then detects a correlation between the pixel area 80 and the reference pixel area 8$i$.

In the above manner, each of the correlation generating units 61-1 through 61-8 corresponding to the pairs with the reference viewpoint sets the reference pixel area for the current pixel area, and detects a correlation between the current pixel area and the reference pixel area.

Meanwhile, the correlation generating unit 61-9 determines the pixel area corresponding to the current pixel area. Specifically, when the coordinates of the center of the current pixel area are the coordinates $(x_0, y_0)$, the correlation generating unit 61-9 sequentially determines that the coordinates shifted by the amount equivalent to $\Delta d_2$ in the direction at the angle of $(\theta 2+180)$ degrees corresponding to the imaging unit 41-2 are the coordinates of the center of the pixel area corresponding to the current pixel area, with the initial values being the coordinates $(x_0, y_0)$.

With the coordinates $(x_0, y_0)$ being the initial values, the correlation generating unit 61-9 also sequentially determines that the coordinates shifted by the amount equivalent to $\Delta d_1$ in the direction at an angle of $(\theta 1+180)$ degrees corresponding to the imaging unit 41-1 are the coordinates of the center of the reference pixel area. The correlation generating unit 61-9 then detects a correlation between the pixel area corresponding to the current pixel area and the reference pixel area. The correlation generating units 61-10 through 61-16 perform correlation detection in the same manner as the correlation generating unit 61-9.

In the above manner, each of the correlation generating units 61-9 through 61-16 corresponding to the pairs of viewpoints other than the reference viewpoint sets the pixel area corresponding to the current pixel area and the reference pixel area for the current pixel area. A correlation is then detected between the pixel area corresponding to the current pixel area and the reference pixel area.

It should be noted that $\Delta d_1$ through $\Delta d_g$ are values defined by the expression (1) shown below.

[Mathematical Formula 1]

$$L1/\Delta d_1 = L2/\Delta d_2 = L3/\Delta d_3 = L4/\Delta d_4 = L5/\Delta d_5 = L6/\Delta d_6 = L7/\Delta d_7 = L8/\Delta d_8 \qquad (1)$$

(Explanation of the Hierarchical Table)

Figure 6:
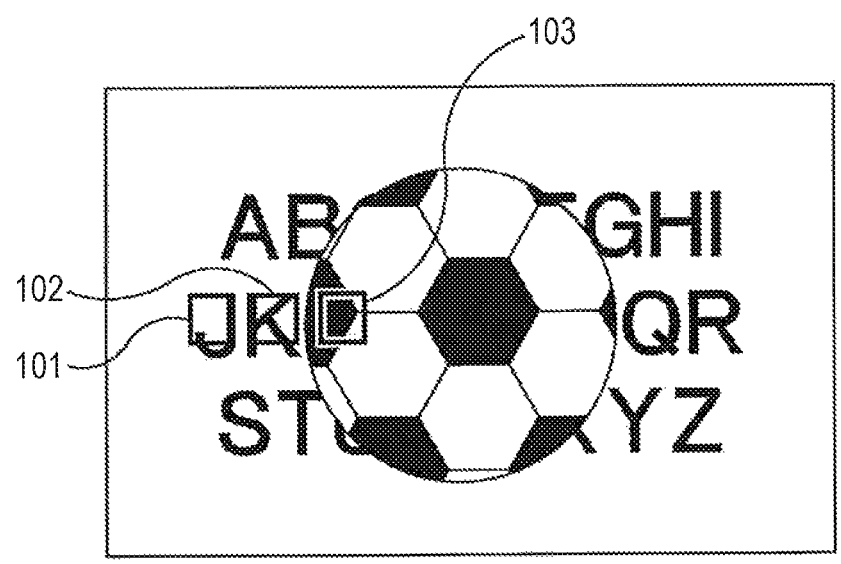
FIG. 6 is a diagram showing an example of part of the current pixel area.

FIG. 6 is a diagram showing an example of part of the current pixel area in the captured image of the reference viewpoint shown in FIG. 5.

As shown in FIG. 6, in the captured image of the reference viewpoint shown in FIG. 5, the current pixel area may be a pixel area 101 including part of "J" written in the background, a pixel area 102 including part of "K", a pixel area 103 including "L" hidden by the soccer ball, or the like.

Figure 7:
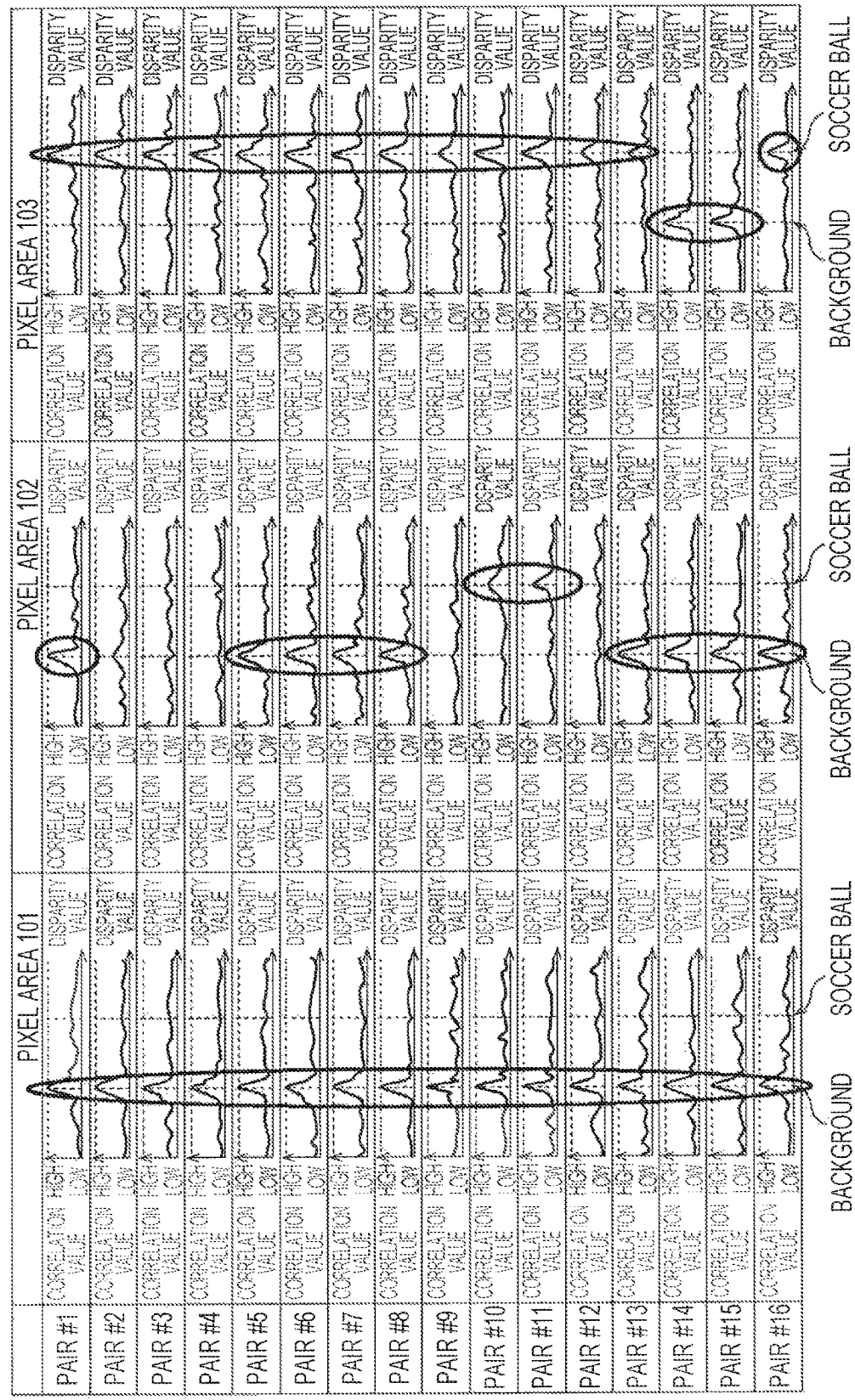
FIG. 7 is a diagram showing an example of correlation value information.

FIG. 7 is a diagram showing the correlation value information about the captured images shown in FIG. 5 in a case where the coordinates of the centers of the pixel areas 101 through 103 are the coordinates of the center of the current pixel area.

In FIG. 7, the abscissa axes indicate the disparity values of the correlation value information, and the ordinate axes indicate the correlation values.

As shown in the left column in FIG. 7, in the correlation value information about the pairs #1 through #16 in a case where the coordinates of the center of the pixel area 101 are the coordinates of the center of the current pixel area, the correlation values corresponding to the disparity value of the background are the highest, and the correlation values are equal to or higher than the threshold value.

That is, among the captured images shown in FIG. 5, the image of the background of the pixel area 101 exists at all the viewpoints. Accordingly, the highest correlation values in all the pairs #1 through #16 are equal to or higher than the threshold value, and the highest correlation disparity values are the disparity value of the background.

In a case where the highest correlation disparity values in all the pairs #1 through #16 are the disparity value of the background, the disparity value of the first hierarchical level of the current pixel area can be generated with the use of the disparity value of the background.

As shown in the middle column in FIG. 7, in the correlation value information about the pair #1, the pairs #5 through #8, and the pairs #13 through #16 in a case where the coordinates of the center of the pixel area 102 are the coordinates of the center of the current pixel area, the correlation values corresponding to the disparity value of the background are the highest, and the correlation values are equal to or higher than the threshold value.

That is, among the captured images shown in FIG. 5, the image of the background of the pixel area 102 exists in the images captured by the imaging unit 41-0, the imaging unit 41-2, the imaging unit 41-3, the imaging unit 41-5, the imaging unit 41-7, and the imaging unit 41-8. Accordingly, the highest correlation values in the pair #1, the pairs #5 through #8, and the pairs #13 through #16 are equal to or higher than the threshold value, and the highest correlation disparity values are the disparity value of the background.

Meanwhile, in the correlation value information about the pairs #2 through #4, the pair #9, and the pair 112, the highest correlation values are smaller than the threshold value. In the correlation value information about the pair #10 and the pair #11, the correlation values corresponding to the disparity value of the soccer ball are the highest, and the correlation values are equal to or higher than the threshold value.

That is, among the captured images shown in FIG. 5, the image of the background of the pixel area 102 is hidden by the image of the soccer ball in the images captured by the imaging unit 41-1, the imaging unit 41-4, and the imaging unit 41-6. Therefore, the images corresponding to the pixel area 102 captured by the imaging unit 41-1, the imaging unit 41-4, and the imaging unit 41-6 differ from the images corresponding to the pixel area 102 captured by the imaging unit 41-0, the imaging unit 41-2, the imaging unit 41-3, the imaging unit 41-5, the imaging unit 41-7, and the imaging unit 41-8.

Accordingly, the highest correlation values are smaller than the threshold value in the pairs #2 through #4, the pair #9, and the pair #12, which correspond to the imaging unit 41-1, the imaging unit 41-4, or the imaging unit 41-6, and to the imaging unit 41-0, the imaging unit 41-2, the imaging unit 41-3, the imaging unit 41-5, the imaging unit 41-7, or the imaging unit 41-8.

Meanwhile, the images corresponding to the pixel area 102 captured by the imaging unit 41-1, the imaging unit 41-4, and the imaging unit 41-6 are the same, showing the soccer ball. Accordingly, in the pair #10 and the pair #11, which correspond to two of the imaging unit 41-1, the imaging unit 41-4, and the imaging unit 41-6, the highest correlation values are equal to or higher than the threshold value, and the highest correlation disparity values are the disparity value of the soccer ball.

Figure 8:
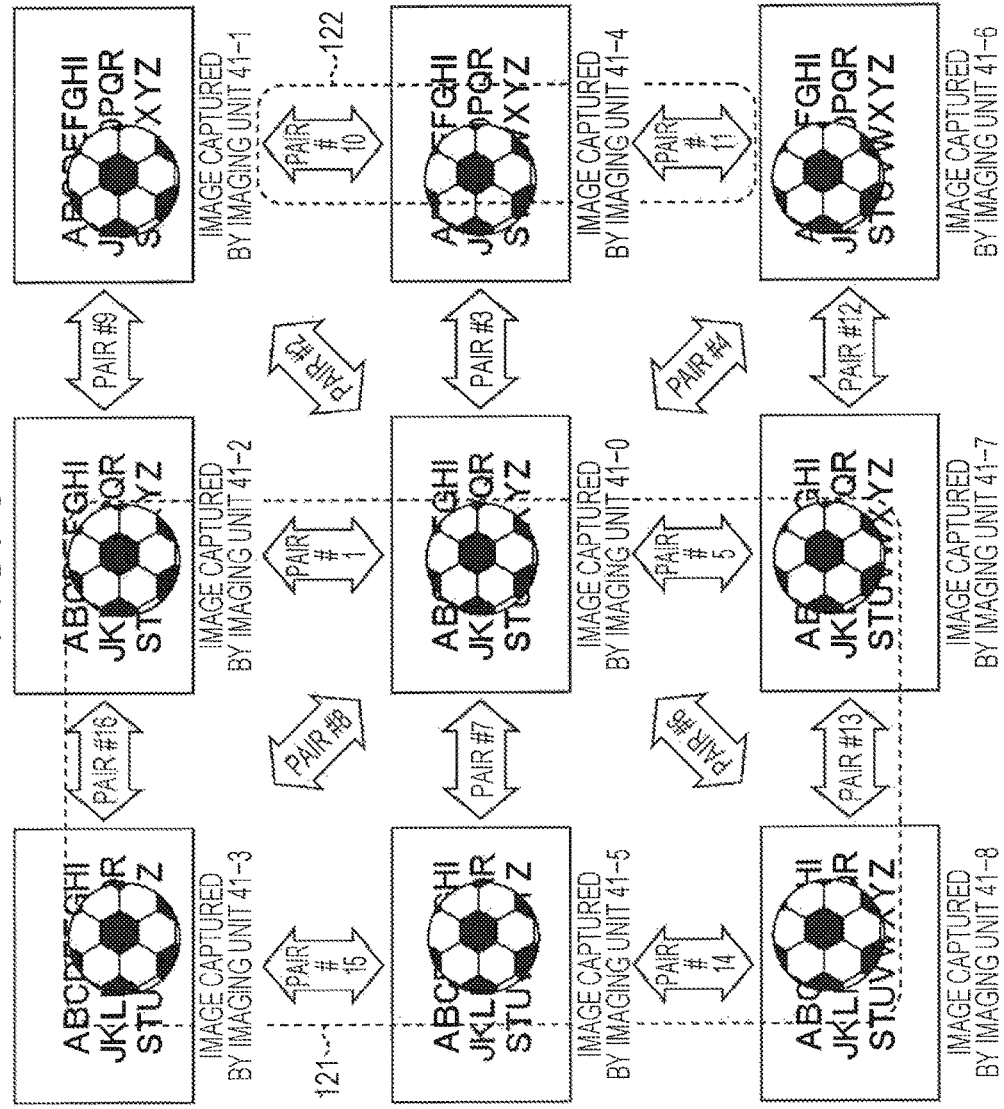
FIG. 8 is a diagram showing groups of highest correlation disparity values of the current pixel area.

As described above, in the correlation value information about the pair #1, the pairs #5 through #8, and the pairs #13 through #16, which are surrounded by a rectangle 121 indicated by a dashed line in FIG. 8 in a case where the coordinates of the center of the pixel area 102 are the coordinates of the center of the current pixel area, the highest correlation disparity values are the disparity value of the background. In the correlation value information about the pair #10 and the pair #11, which are surrounded by a dashed-line rectangle 122, the highest correlation disparity values are the disparity value of the soccer ball.

In such a case, the highest correlation disparity values corresponding to all the pairs of viewpoints other than the reference viewpoint are equal to or higher than the highest correlation disparity values corresponding to the pairs with the reference viewpoint, and therefore, are not the disparity value of the occlusion region of the reference viewpoint. Accordingly, only the disparity value of the first hierarchical level of the current pixel area can be generated with the use of the disparity value of the background, which is the highest correlation disparity values of the pairs with the reference viewpoint, and the highest correlation disparity values of the pairs #13 through #16, which have the disparity value of the background as the highest correlation disparity values.

As shown in the right column in FIG. 7, in the correlation value information about the pairs #1 through #13 and the pair #16 in a case where the coordinates of the center of the pixel area 103 are the coordinates of the center of the current pixel area, the correlation values corresponding to the disparity value of the soccer ball are the highest, and the correlation values are equal to or higher than the threshold value.

That is, among the captured images shown in FIG. 5, the image corresponding to the pixel area 103 is the image of the soccer ball in the images captured by the imaging units 41-0 through 41-2, the imaging unit 41-4, the imaging unit 41-6, and the imaging unit 41-7. Also, the image of the soccer ball exists in the captured images of all the viewpoints. Accordingly, in the pairs #1 through #13 and the pair #16, which form pairs with the viewpoints corresponding to the imaging units 41-0 through 41-2, the imaging unit 41-4, the imaging unit 41-6, and the imaging unit 41-7, the highest correlation values are equal to or higher than the threshold value, and the highest correlation disparity values are the disparity value of the soccer ball.

Meanwhile, in the correlation value information about the pair #14 and the pair #15, the correlation values corresponding to the disparity value of the background are the highest, and the correlation values are equal to or higher than the threshold value.

That is, among the captured images shown in FIG. 5, the image corresponding to the pixel area 103 is the image of the background, and the image of the background exists in each of the images captured by the imaging unit 41-3, the imaging unit 41-5, and the imaging unit 41-8. Accordingly, in the pair #14 and the pair #15, which correspond to the pairs with the viewpoints corresponding to the imaging unit 41-3, the imaging unit 41-5, or the imaging unit 41-8, the highest correlation values are equal to or higher than the threshold value, and the highest correlation disparity values are the disparity value of the background.

Figure 9:
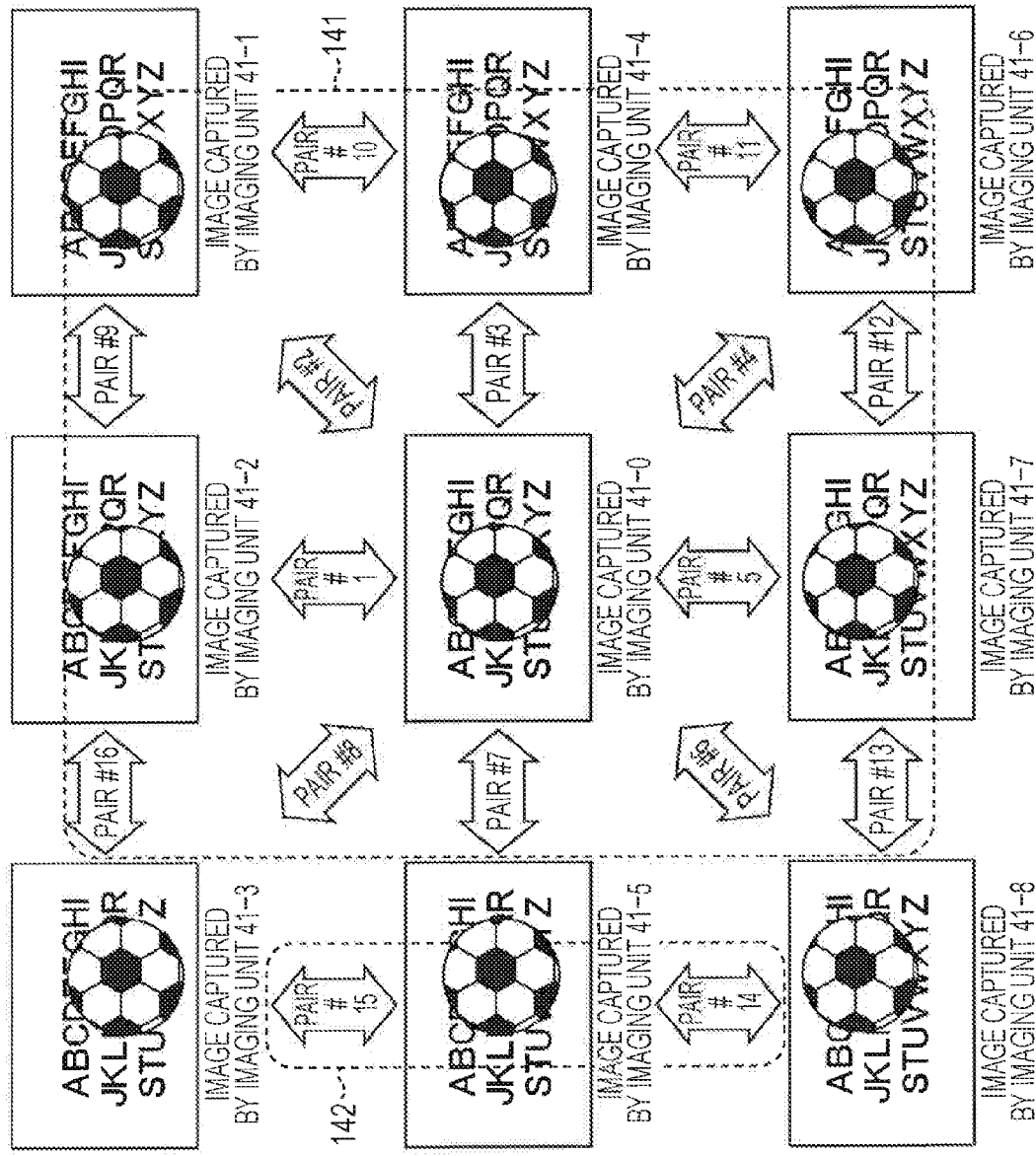
FIG. 9 is a diagram showing other groups of highest correlation disparity values of the current pixel area.

As described above, in the correlation value information about the pairs #1 through #13 and the pair 16, which are surrounded by a rectangle 141 indicated by a dashed line in FIG. 9 in a case where the coordinates of the center of the pixel area 103 are the coordinates of the center of the current pixel area, the highest correlation disparity values are the disparity value of the soccer ball. In the correlation value information about the pair #14 and the pair #15, which are surrounded by a dashed-line rectangle 142, the highest correlation disparity values are the disparity value of the background.

In such a case, the highest correlation disparity values corresponding to all the pairs of viewpoints other than the reference viewpoint are smaller than the highest correlation disparity values corresponding to the pairs with the reference viewpoint. That is, occlusion of the reference viewpoint occurs in the current pixel area.

Accordingly, only the disparity value of the second hierarchical level of the current pixel area can be generated with the use of the smaller disparity values than the highest correlation disparity values corresponding to the pairs with the reference viewpoint among the highest correlation disparity values of the pairs of viewpoints other than the reference viewpoint.

Also, only the disparity value of the first hierarchical level of the current pixel area can be generated with the use of the disparity value of the background, which is the highest correlation disparity values of the pairs with the reference viewpoint, and the highest correlation disparity values of the pairs #9 through #13 and the pair #16, which have the disparity value of the background as the highest correlation disparity values.

As described above with reference to FIGS. 7 through 9, a check is made to determine whether occlusion of the reference viewpoint is to occur in the current pixel area in accordance with the disparity value patterns corresponding to the highest correlation values of the respective pairs. In this manner, the number of hierarchical levels of the disparity values in the current pixel area, and the disparity value to be used in generating the disparity value of each hierarchical level can be determined. Accordingly, in the hierarchical table, the disparity value patterns corresponding to the highest correlation values of the respective pairs are associated with the pairs corresponding to the disparity values of the respective hierarchical levels.

Figure 10:
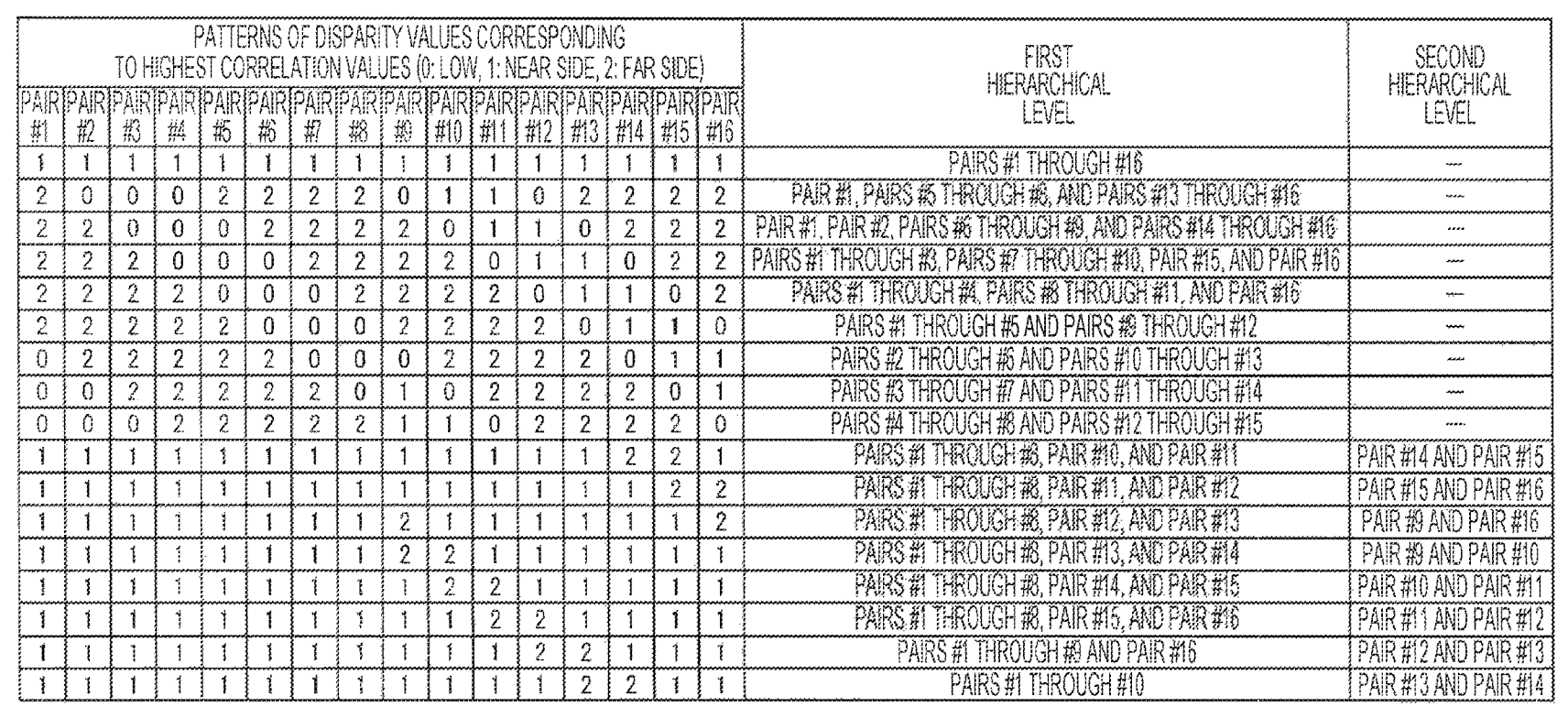

FIG. 10 is a diagram showing an example of the hierarchical table.

As shown in FIG. 10, in the hierarchical table, the pattern in which the smallest values and the largest values of the highest correlation disparity values of all the pairs #1 through #16 fall within a predetermined range is associated with the pairs #1 through #16 as the pairs corresponding to the disparity value of the first hierarchical level. Accordingly, in a case where the smallest values and the largest values of the highest correlation disparity values of all the pairs fall within the predetermined range, or where the highest correlation disparity values of all the pairs are one kind of disparity value, the disparity value of the first hierarchical level is generated with the use of the highest correlation disparity values of all the pairs.

The pattern in which the highest correlation disparity values in the pair #1, the pairs #5 through #8, and the pairs #13 through #16 are disparity values on the farther side, the highest correlation disparity values in the pair #10 and the pair #11 are disparity values on the nearer side, and the highest correlation values in the remaining pairs are smaller than the threshold value is associated with the pair #1, the pairs #5 through #8, and the pairs #13 through #16, which correspond to the disparity values on the farther side as the pairs corresponding to the first hierarchical level.

Likewise, the pattern in which the highest correlation disparity values in the pair #1, the pair #2, the pairs #6 through #9, and the pairs #14 through #16 are disparity values on the farther side, the highest correlation disparity values in the pair #11 and the pair #12 are disparity values on the nearer side, and the highest correlation values in the remaining pairs are smaller than the threshold value is associated with the pairs that correspond to the disparity values on the farther side as the pairs corresponding to the first hierarchical level.

Likewise, the pattern in which the highest correlation disparity values in the pairs #1 through #3, the pairs #7 through #10, the pair #15, and the pair #16 are disparity values on the farther side, the highest correlation disparity values in the pair #12 and the pair #13 are disparity values on the nearer side, and the highest correlation values in the remaining pairs are smaller than the threshold value is associated with the pairs that correspond to the disparity values on the farther side as the pairs corresponding to the first hierarchical level.

Likewise, the pattern in which the highest correlation disparity values in the pairs #1 through #4, the pairs #8 through #11, and the pair #16 are disparity values on the farther side, the highest correlation disparity values in the pair #13 and the pair #14 are disparity values on the nearer side, and the highest correlation values in the remaining pairs are smaller than the threshold value is associated with the pairs that correspond to the disparity values on the farther side as the pairs corresponding to the first hierarchical level.

Likewise, the pattern in which the highest correlation disparity values in the pairs #1 through #5 and the pairs #9 through #12 are disparity values on the farther side, the highest correlation disparity values in the pair #14 and the pair #15 are disparity values on the nearer side, and the highest correlation values in the remaining pairs are smaller than the threshold value is associated with the pairs that correspond to the disparity values on the farther side as the pairs corresponding to the first hierarchical level.

Likewise, the pattern in which the highest correlation disparity values in the pairs #2 through #6 and the pairs #10 through #13 are disparity values on the farther side, the highest correlation disparity values in the pair #15 and the pair #16 are disparity values on the nearer side, and the highest correlation values in the remaining pairs are smaller than the threshold value is associated with the pairs that correspond to the disparity values on the farther side as the pairs corresponding to the first hierarchical level.

Likewise, the pattern in which the highest correlation disparity values in the pairs #3 through #7 and the pairs #11 through #14 are disparity values on the farther side, the highest correlation disparity values in the pair #9 and the pair #16 are disparity values on the nearer side, and the highest correlation values in the remaining pairs are smaller than the threshold value is associated with the pairs that correspond to the disparity values on the farther side as the pairs corresponding to the first hierarchical level.

Likewise, the pattern in which the highest correlation disparity values in the pairs #4 through #8 and the pairs #12 through #15 are disparity values on the farther side, the highest correlation disparity values in the pair #9 and the pair #10 are disparity values on the nearer side, and the highest correlation values in the remaining pairs are smaller than the threshold value is associated with the pairs that correspond to the disparity values on the farther side as the pairs corresponding to the first hierarchical level.

In a case where the highest correlation disparity values of the pairs with the reference viewpoint are disparity values on the farther side, the disparity value of the first hierarchical level is generated in the above manner with the use of the highest correlation disparity values of the pairs having the highest correlation disparity values as disparity values on the farther side.

Meanwhile, the pattern in which the highest correlation disparity values in the pairs #1 through #13 and the pair #16 are disparity values on the nearer side, and the highest correlation disparity values in the pair #14 and the pair #15 are disparity values on the farther side is associated with the 10 pairs consisting of the pairs #1 through #8, the pair #10, and the pair #11 as the pairs corresponding to the first hierarchical level among the pairs corresponding to the disparity values on the nearer side. The pattern is also associated with the pair #14 and the pair #15 that correspond to the disparity values on the farther side as the pairs corresponding to the second hierarchical level.

Likewise, the pattern in which the highest correlation disparity values in the pairs #1 through #14 are disparity values on the nearer side, and the highest correlation disparity values in the pair #15 and the pair #16 are disparity values on the farther side is associated with the 10 pairs consisting of the pairs #1 through #8, the pair #11, and the pair #12 as the pairs corresponding to the first hierarchical level among the pairs corresponding to the disparity values on the nearer side. The pattern is also associated with the pair #15 and the pair #16 that correspond to the disparity values on the farther side as the pairs corresponding to the second hierarchical level.

Likewise, the pattern in which the highest correlation disparity values in the pairs #1 through #8 and the pairs #10 through #15 are disparity values on the nearer side, and the highest correlation disparity values in the pair #9 and the pair #16 are disparity values on the farther side is associated with the 10 pairs consisting of the pairs #1 through #8, the pair #12, and the pair #13 as the pairs corresponding to the first hierarchical level among the pairs corresponding to the disparity values on the nearer side. The pattern is also associated with the pair #9 and the pair #16 that correspond to the disparity values on the farther side as the pairs corresponding to the second hierarchical level.

Likewise, the pattern in which the highest correlation disparity values in the pairs #1 through #8 and the pairs #11 through #16 are disparity values on the nearer side, and the highest correlation disparity values in the pair #9 and the pair #10 are disparity values on the farther side is associated with the 10 pairs consisting of the pairs #1 through #8, the pair #13, and the pair #14 as the pairs corresponding to the first hierarchical level among the pairs corresponding to the disparity values on the nearer side. The pattern is also associated with the pair #9 and the pair #10 that correspond to the disparity values on the farther side as the pairs corresponding to the second hierarchical level.

Likewise, the pattern in which the highest correlation disparity values in the pairs #1 through #9 and the pairs #12 through #16 are disparity values on the nearer side, and the highest correlation disparity values in the pair #10 and the pair #11 are disparity values on the farther side is associated with the 10 pairs consisting of the pairs #1 through #8, the pair #14, and the pair #15 as the pairs corresponding to the first hierarchical level among the pairs corresponding to the disparity values on the nearer side. The pattern is also associated with the pair #10 and the pair #11 that correspond to the disparity values on the farther side as the pairs corresponding to the second hierarchical level.

Likewise, the pattern in which the highest correlation disparity values in the pairs #1 through #10 and the pairs #13 through #16 are disparity values on the nearer side, and the highest correlation disparity values in the pair #11 and the pair #12 are disparity values on the farther side is associated with the 10 pairs consisting of the pairs #1 through #8, the pair #15, and the pair #16 as the pairs corresponding to the first hierarchical level among the pairs corresponding to the disparity values on the nearer side. The pattern is also associated with the pair #11 and the pair #12 that correspond to the disparity values on the farther side as the pairs corresponding to the second hierarchical level.

Likewise, the pattern in which the highest correlation disparity values in the pairs #1 through #11 and the pairs #14 through #16 are disparity values on the nearer side, and the highest correlation disparity values in the pair #12 and the pair #13 are disparity values on the farther side is associated with the 10 pairs consisting of the pairs #1 through #9 and the pair #16 as the pairs corresponding to the first hierarchical level among the pairs corresponding to the disparity values on the nearer side. The pattern is also associated with the pair #12 and the pair #13 that correspond to the disparity values on the farther side as the pairs corresponding to the second hierarchical level.

Likewise, the pattern in which the highest correlation disparity values in the pairs #1 through #12, the pair #15, and the pair #16 are disparity values on the nearer side, and the highest correlation disparity values in the pair #13 and the pair #14 are disparity values on the farther side is associated with the 10 pairs consisting of the pairs #1 through #10 as the pairs corresponding to the first hierarchical level among the pairs corresponding to the disparity values on the nearer side. The pattern is also associated with the pair #13 and the pair #14 that correspond to the disparity values on the farther side as the pairs corresponding to the second hierarchical level.

In a case where the highest correlation disparity values of the pairs with the reference viewpoint are disparity values on the nearer side, the disparity value of the first hierarchical level is generated in the above manner with the use of the highest correlation disparity values of the pairs having the highest correlation disparity values as disparity values on the nearer side. Also, the disparity value of the second hierarchical level is generated with the use of the highest correlation disparity values of the pairs having the highest correlation disparity values as disparity values on the farther side.

In the example shown in FIG. 10, only 10 pairs among the pairs having the highest correlation disparity values as disparity values on the nearer side are associated with the first hierarchical level. However, all the pairs having the highest correlation disparity values as disparity values on the nearer side may be associated with the first hierarchical level.

(Example of Parallax Images of the First Hierarchical Level and the Second Hierarchical Level of the Reference Viewpoint)

Figure 11:
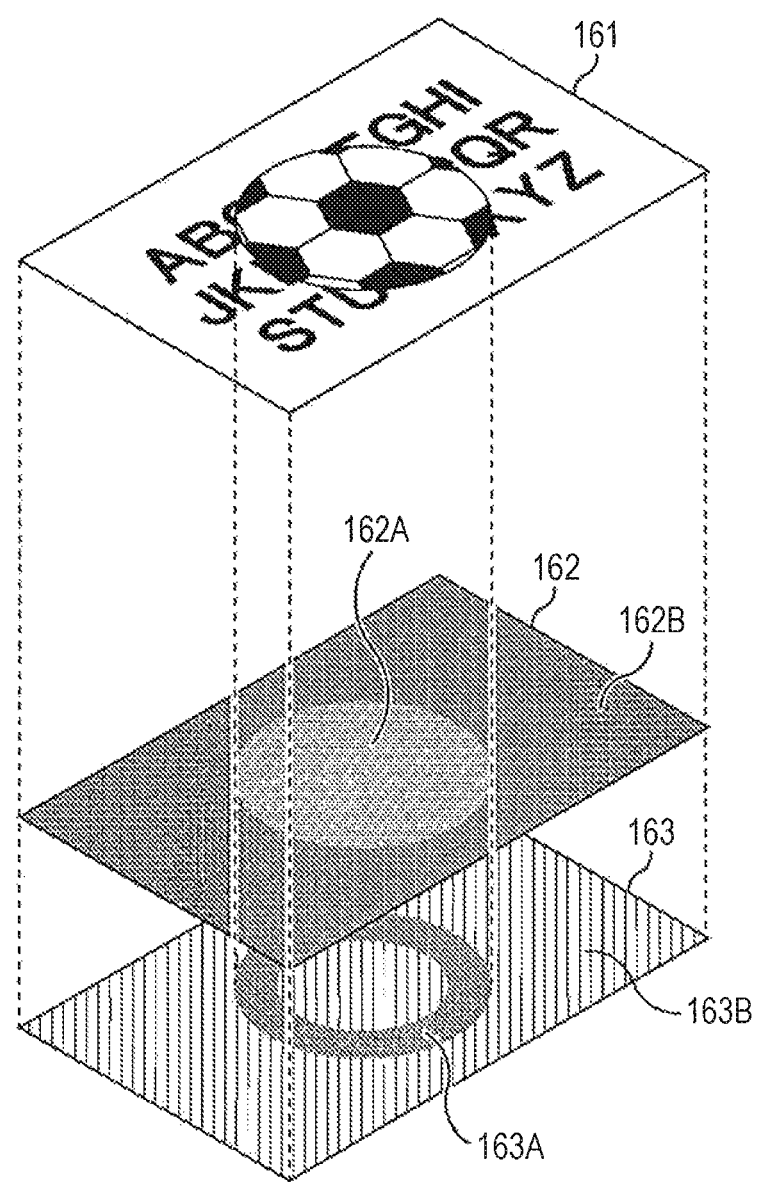
FIG. 11 is a diagram showing an example of parallax images of the first hierarchical level and the second hierarchical level of the reference viewpoint.

FIG. 11 is a diagram showing an example of parallax images of the first hierarchical level and the second hierarchical level of the captured image of the reference viewpoint shown in FIG. 4.

As shown in FIG. 11, for the captured image 161 of the reference viewpoint, a parallax image 162 formed with the disparity value of the reference viewpoint is generated as the parallax image of the first hierarchical level of the reference viewpoint. In the parallax image 162, the disparity value of the region 162A corresponding to the soccer ball in the captured image 161 is large, and the disparity value of the region 162B corresponding to the background is small.

Also, as shown in FIG. 11, for the captured image 161 of the reference viewpoint, a parallax image 163 formed with the disparity value of the occlusion region of the reference viewpoint is generated as the parallax image of the second hierarchical level of the reference viewpoint. In the parallax image 163, the disparity value of the background is the disparity value of the ring-like region 163A corresponding to the region at a predetermined distance inward from the boundary between the soccer ball and the background in the captured image 161. The disparity value of the region 163B other than the region 163A in the parallax image 163 is the value indicating invalidity.

(Example of Parallax Images of Viewpoints Other than the Reference Viewpoint)

Figure 12:
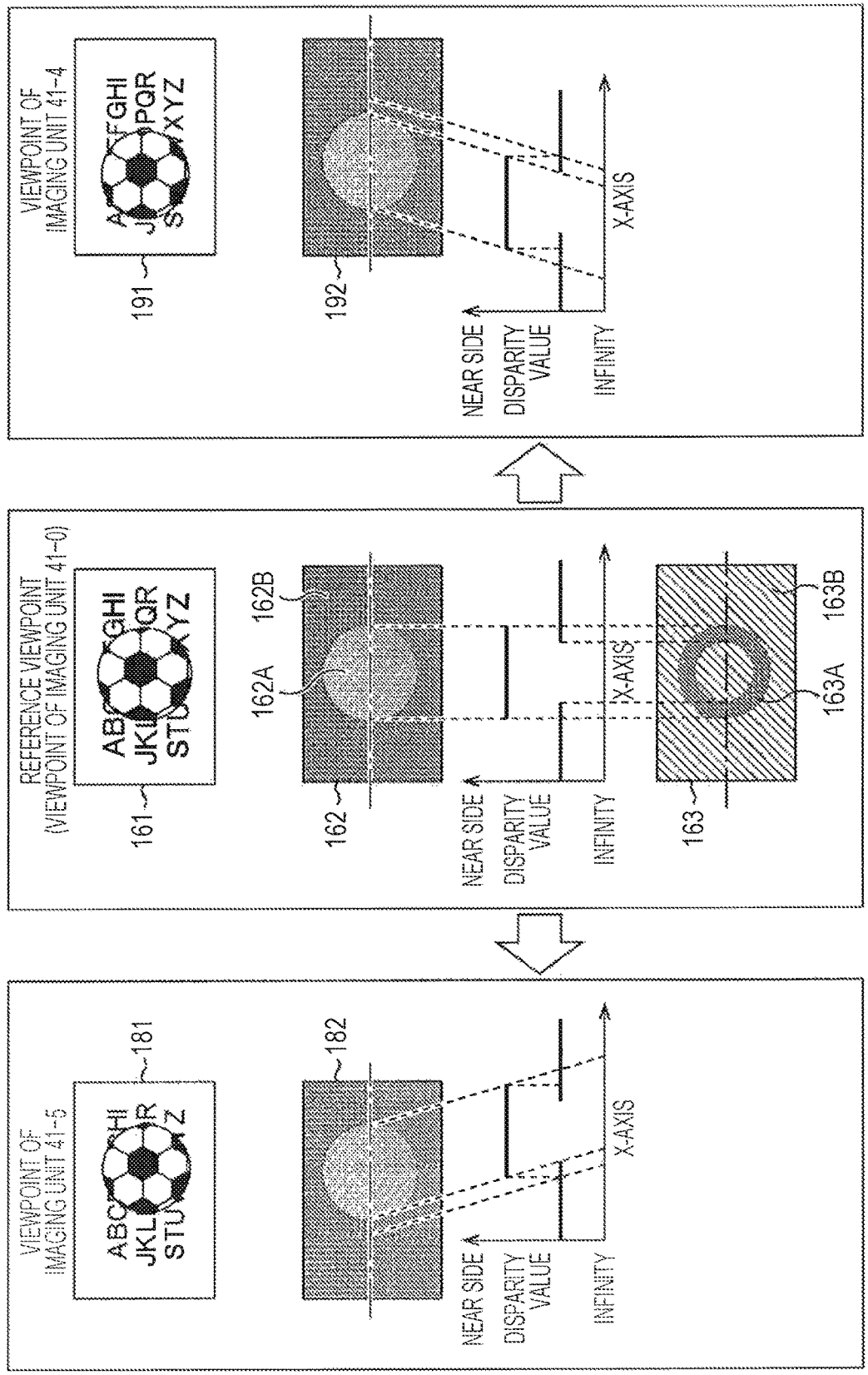
FIG. 12 is a diagram showing an example of parallax images of viewpoints other than the reference viewpoint.

FIG. 12 is a diagram showing an example of parallax images of viewpoints other than the reference viewpoint, the parallax images being generated with the use of the parallax image 162 and the parallax image 163 shown in FIG. 11.

The example in FIG. 12 shows only the parallax image of the viewpoint of the imaging unit 41-5 located to the left of the object of the imaging unit 41-0 corresponding to the reference viewpoint, and the parallax image of the viewpoint of the imaging unit 41-4 located to the right. However, the parallax images of the other viewpoints that are not the reference viewpoint are the same as these parallax images. In the graphs shown in FIG. 12, the abscissa axes indicate the locations of the respective pixels in the horizontal direction (X-axis direction), and the ordinate axes indicate disparity values. The same applies to FIG. 13 described later.

As indicated by the center graph in FIG. 12, the disparity value represented by the parallax image 162 and the parallax image 163 of the region corresponding to the occlusion region in the captured image of the reference viewpoint serves as the disparity values of the background and the soccer ball. That is, the parallax image 162 and the parallax image 163 have the same disparity value in the region corresponding to the occlusion region.

Accordingly, the virtual-viewpoint image generating unit 22 can accurately generate the parallax image 182 corresponding to the captured image 181 of the viewpoint of the imaging unit 41-5, and the parallax image 192 corresponding to the captured image 191 of the viewpoint of the imaging unit 41-4.

That is, the virtual-viewpoint image generating unit 22 generates the parallax image 182 by shifting the disparity value of the region 162A of the parallax image 162 rightward, but is not able to accurately generate the disparity value of the occlusion region since the corresponding disparity value does not exist in the parallax image 162.

However, the virtual-viewpoint image generating unit 22 can also use the parallax image 163, and accordingly, can accurately generate the parallax image 182 by using the disparity value of the parallax image 163 as the disparity value of the occlusion region.

Likewise, the virtual-viewpoint image generating unit 22 generates the parallax image 192 by shifting the disparity value of the region 162A of the parallax image 162 leftward, but can accurately generate the disparity value of the occlusion region by using the disparity value of the parallax image 163.

Figure 13:
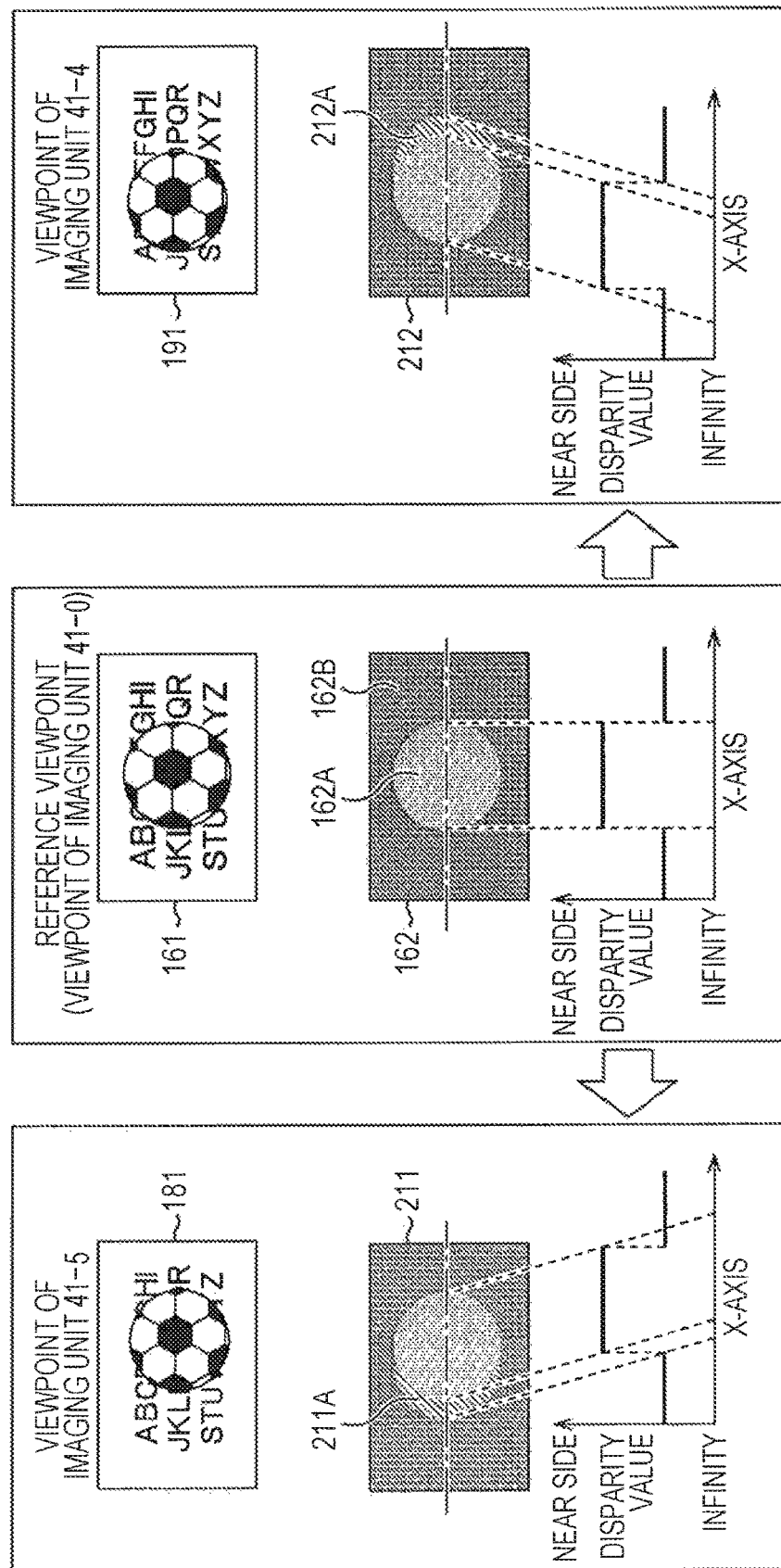
FIG. 13 is a diagram showing an example of conventional parallax images of viewpoints other than the reference viewpoint.

In a case where only the parallax image 162 is generated, on the other hand, the disparity value of the occlusion region is not generated, as shown in the center graph in FIG. 13. Since the disparity value of the occlusion region 211A in the parallax image 211 corresponding to the captured image 181 does not exist in the parallax image 162, the disparity value of the occlusion region 211A is not accurately generated.

Likewise, since the disparity value of the occlusion region 212A in the parallax image 212 corresponding to the captured image 191 does not exist in the parallax image 162, the disparity value of the occlusion region 212A is not accurately generated.

(Example of a Virtual Viewpoint)

Figure 14:
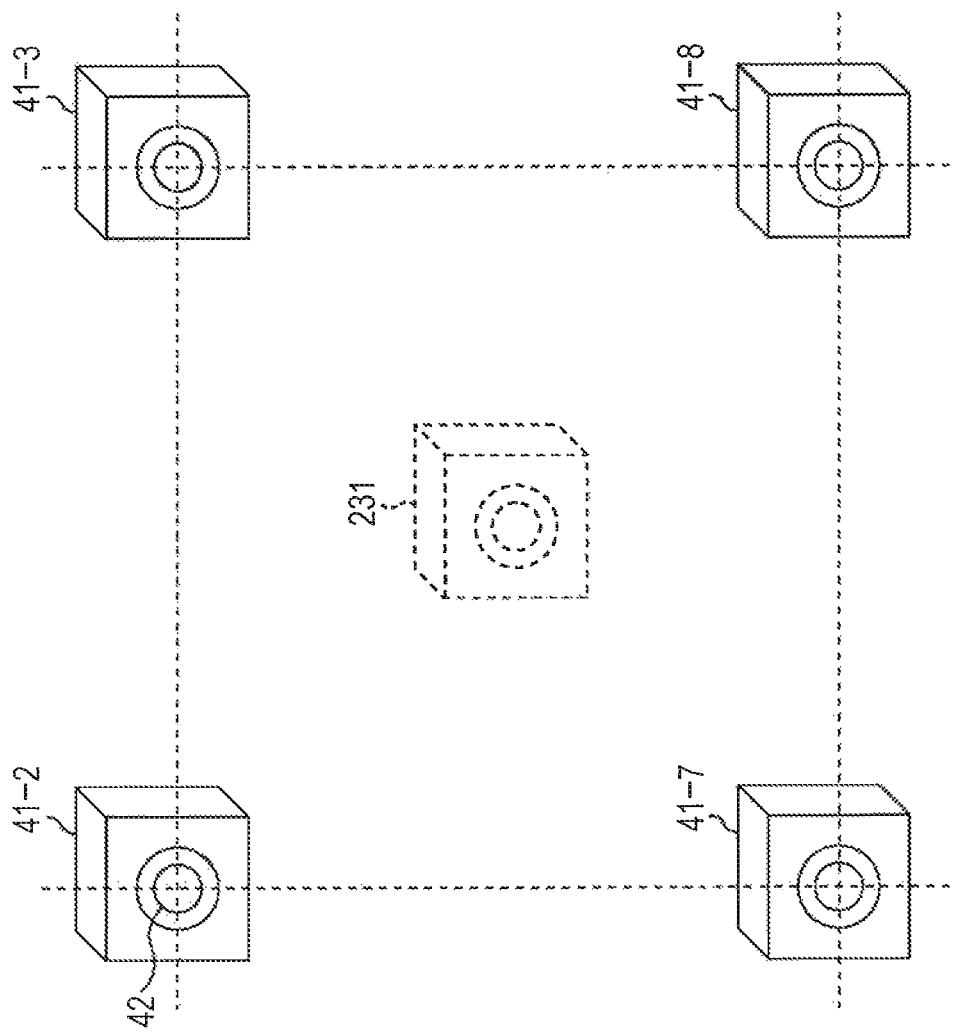
FIG. 14 is a diagram showing an example of a virtual viewpoint.

FIG. 14 is a diagram showing an example of a virtual viewpoint.

In the example shown in FIG. 14, the virtual viewpoint is the viewpoint corresponding to a virtual imaging unit 231 located at the center point among the imaging unit 41-2, the imaging unit 41-3, the imaging unit 41-7, and the imaging unit 41-8.

(Explanation of a Method of Generating a Captured Image of the Virtual Viewpoint)

FIGS. 15 through 20 are diagrams for explaining generation of a captured image of the virtual viewpoint shown in FIG. 14.

Figure 15:
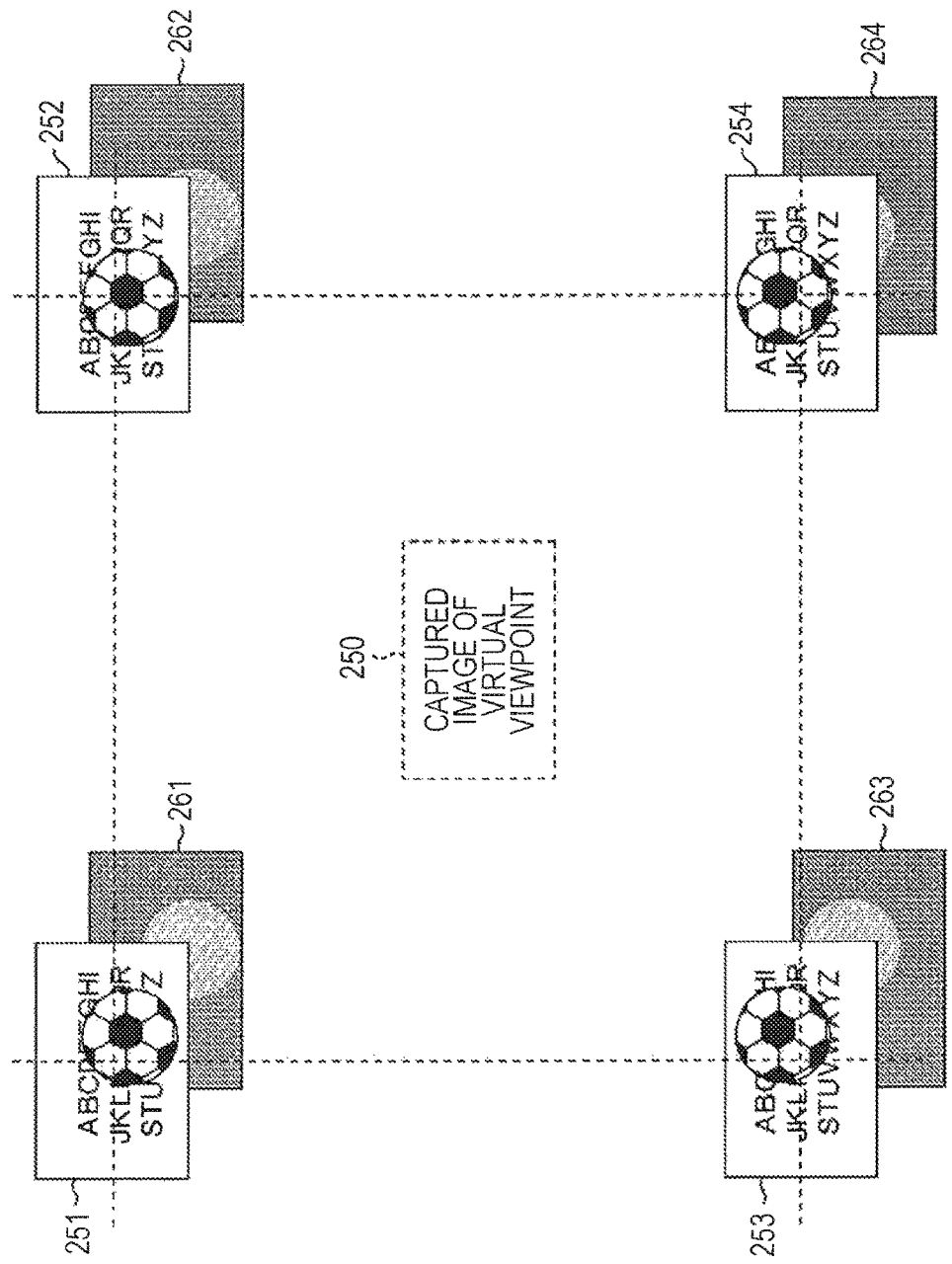
FIG. 15 is a diagram for explaining generation of a captured image of a virtual viewpoint.

As shown in FIG. 15, when generating a captured image 250 of the virtual viewpoint shown in FIG. 14, the virtual-viewpoint image generating unit 22 uses an image 251 captured by the imaging unit 41-3, an image 252 captured by the imaging unit 41-2, an image 253 captured by the imaging unit 41-8, and an image 254 captured by the imaging unit 41-7. The virtual-viewpoint image generating unit 22 also uses parallax images 261 through 264 corresponding to the captured images 251 through 254.

Figure 16:
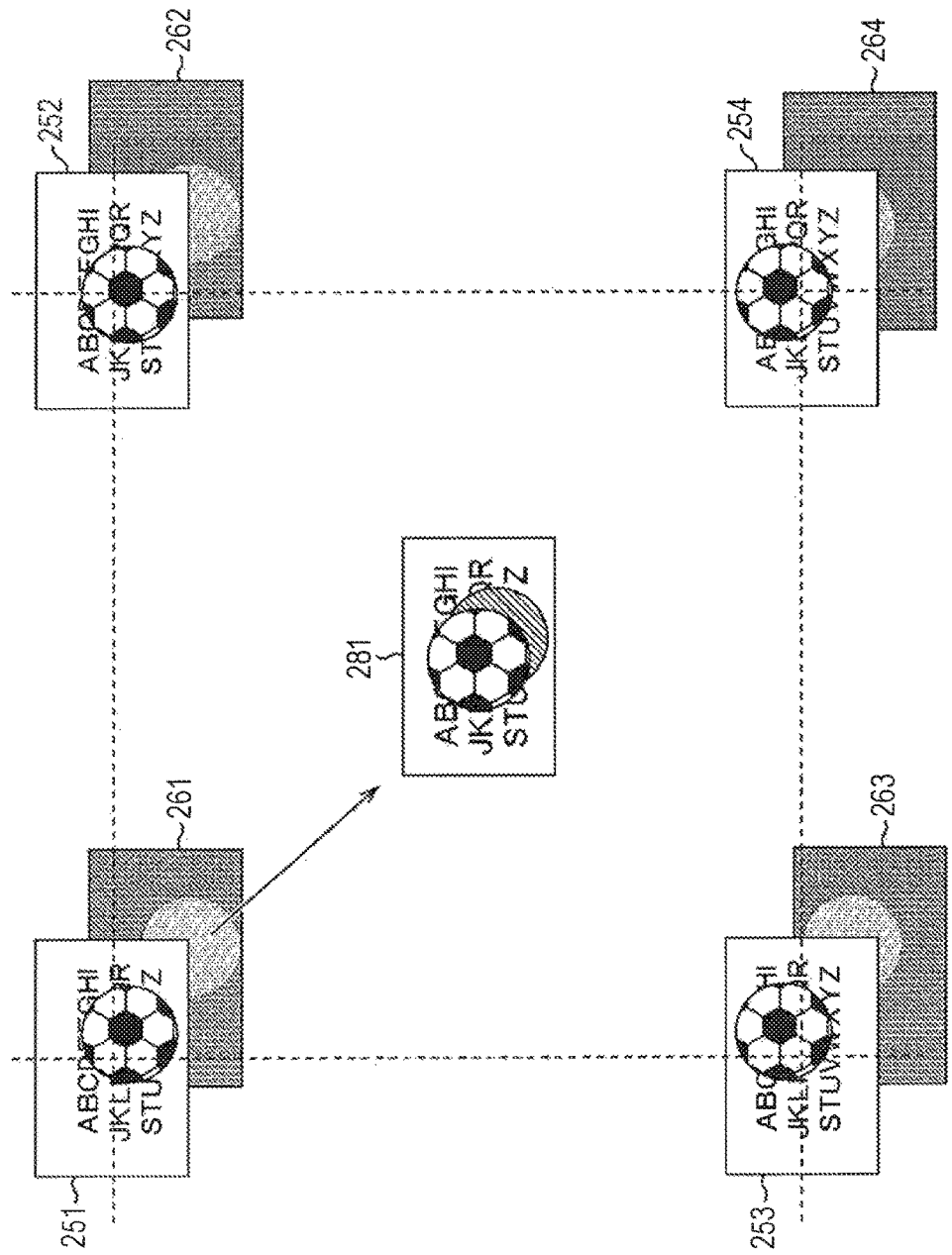
FIG. 16 is a diagram for explaining generation of a captured image of a virtual viewpoint.

Specifically, as shown in FIG. 16, the virtual-viewpoint image generating unit 22 first generates a captured image 281 of the virtual viewpoint, using the captured image 251 and the parallax image 261. Specifically, the virtual-viewpoint image generating unit 22 generates the captured image 281 of the virtual viewpoint by shifting the respective pixels of the captured image 251 by the amount equivalent to the value based on the disparity values of the pixels in the parallax image 261, and on the positional relationship among the reference viewpoint, the viewpoint of the imaging unit 41-2, and the virtual viewpoint, for example.

Figure 17:
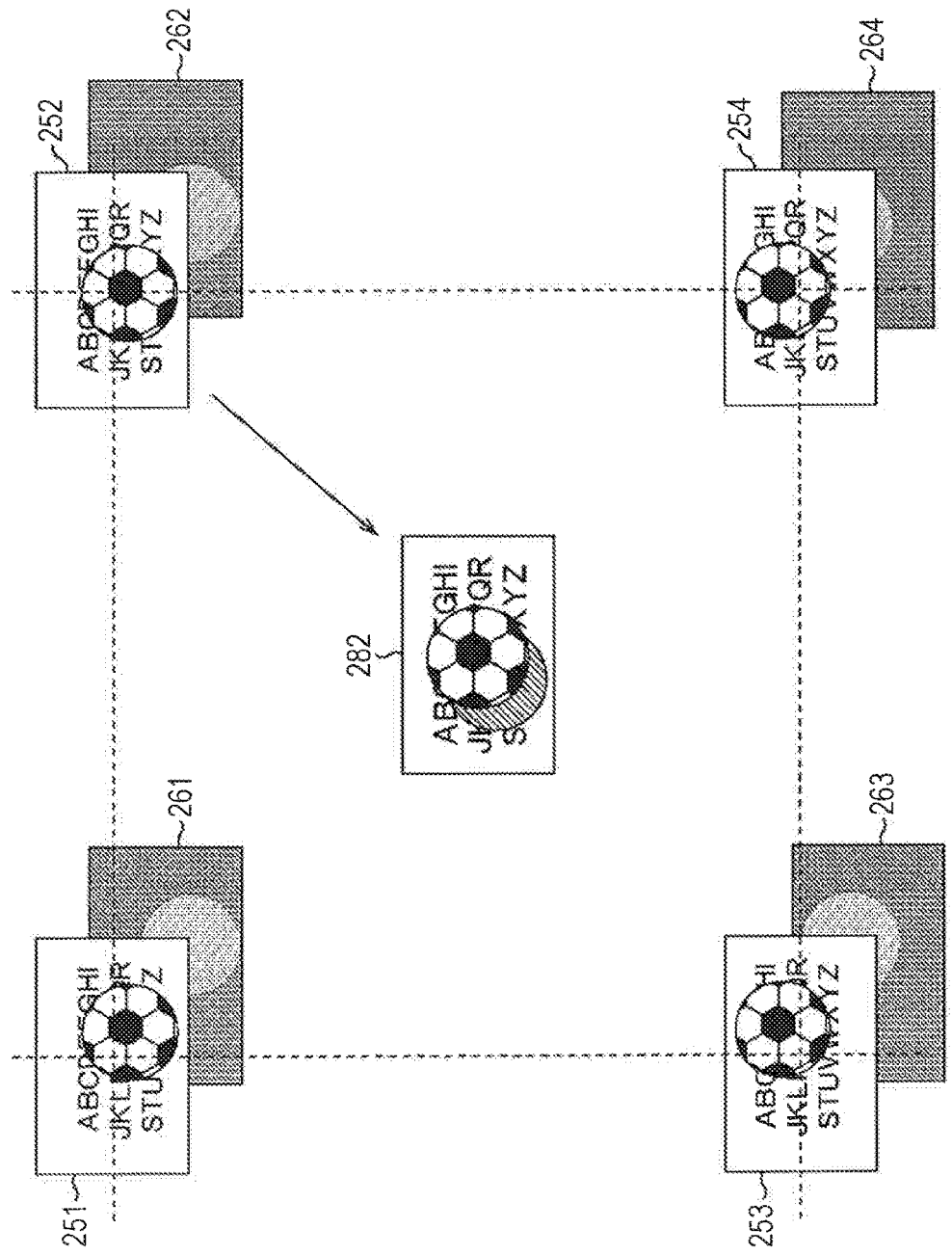
FIG. 17 is a diagram for explaining generation of a captured image of a virtual viewpoint.
Figure 18:
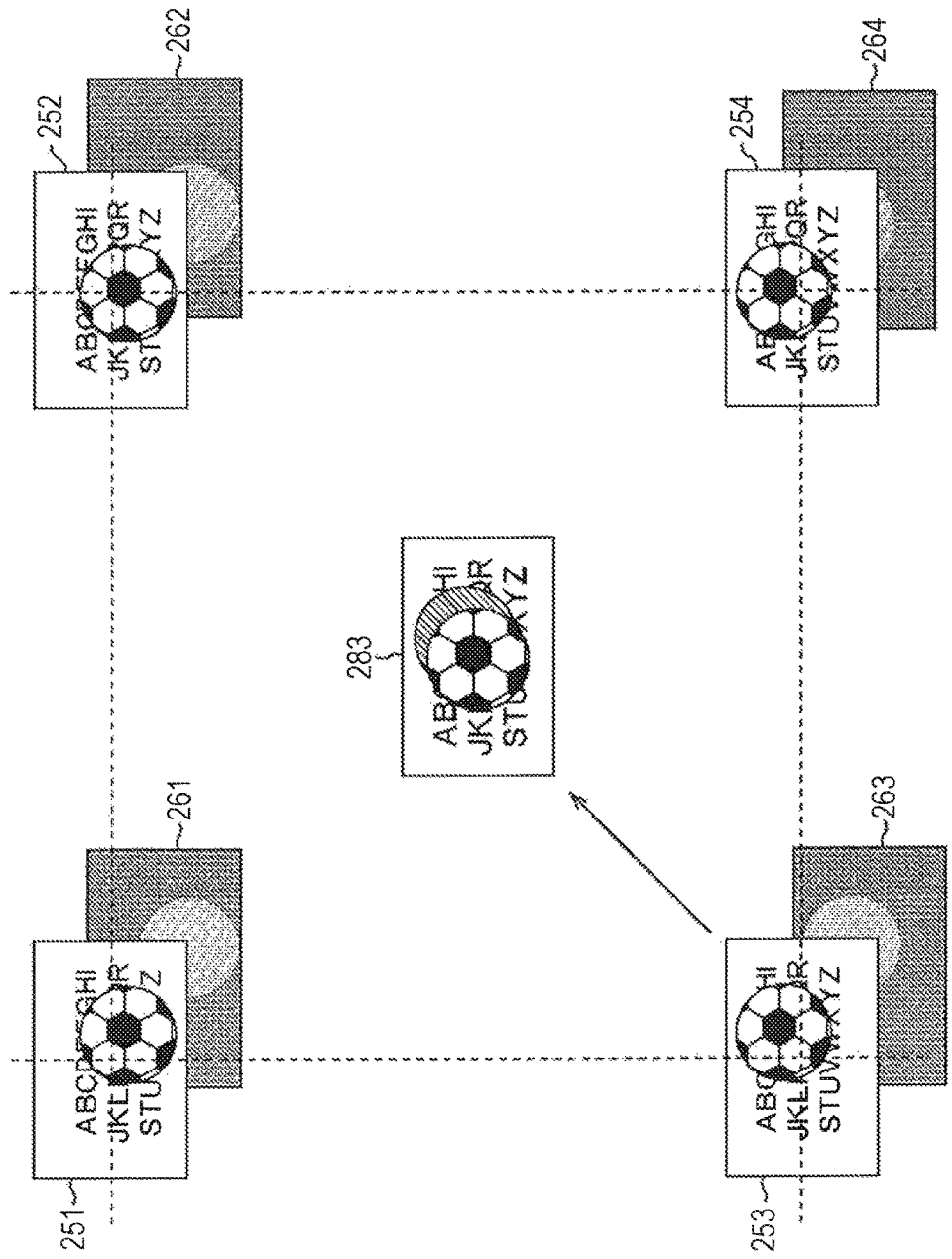
FIG. 18 is a diagram for explaining generation of a captured image of a virtual viewpoint.
Figure 19:
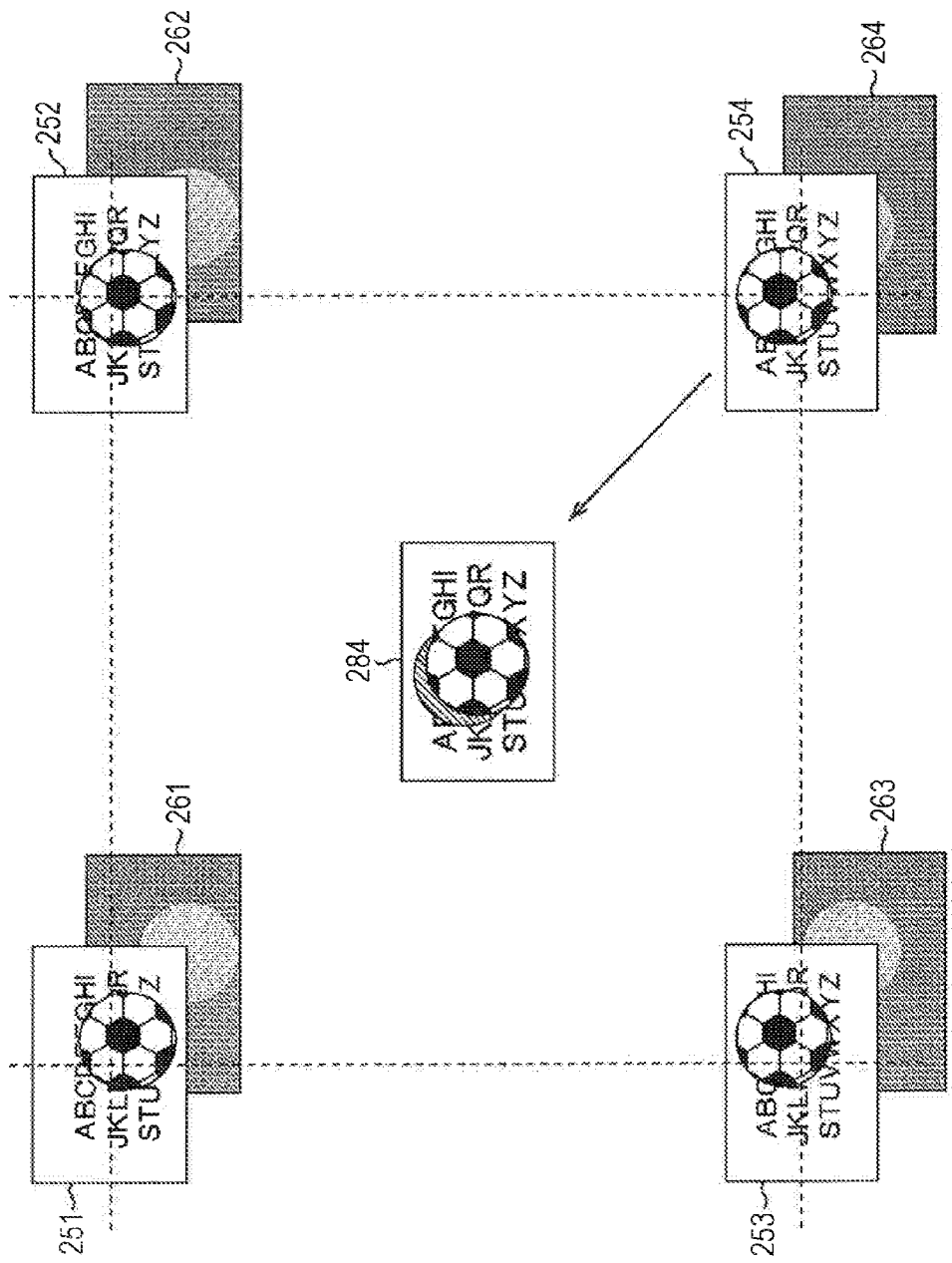
FIG. 19 is a diagram for explaining generation of a captured image of a virtual viewpoint.

As shown in FIG. 17, the virtual-viewpoint image generating unit 22 then generates a captured image 282 of the virtual viewpoint in the same manner as the captured image 281, using the captured image 252 and the parallax image 262. As shown in FIG. 18, the virtual-viewpoint image generating unit 22 also generates a captured image 283 of the virtual viewpoint in the same manner as the captured image 281, using the captured image 253 and the parallax image 263. As shown in FIG. 19, the virtual-viewpoint image generating unit 22 also generates a captured image 284 of the virtual viewpoint in the same manner as the captured image 281, using the captured image 254 and the parallax image 264.

Figure 20:
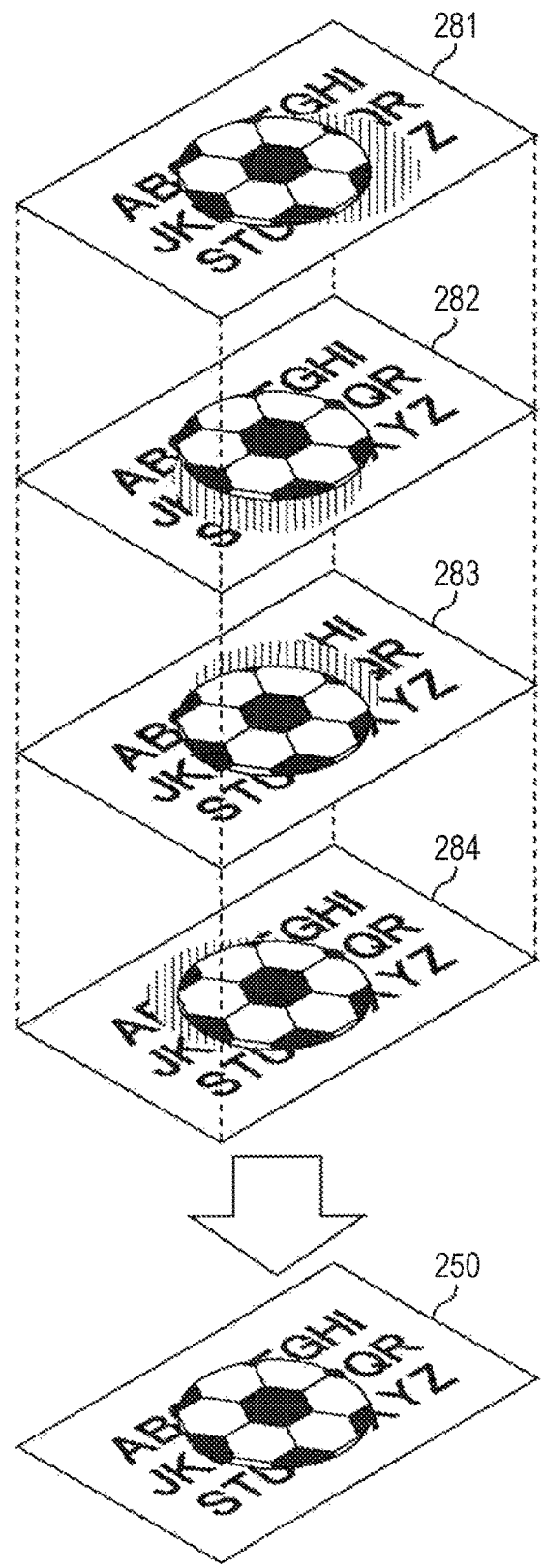
FIG. 20 is a diagram for explaining generation of a captured image of a virtual viewpoint.

As shown in FIG. 20, the virtual-viewpoint image generating unit 22 then combines the captured images 281 through 284 of the virtual viewpoint, and generates the eventual captured image 250 of the virtual viewpoint.

(Explanation of a Process to be Performed by the Imaging Apparatus)

Figure 21:
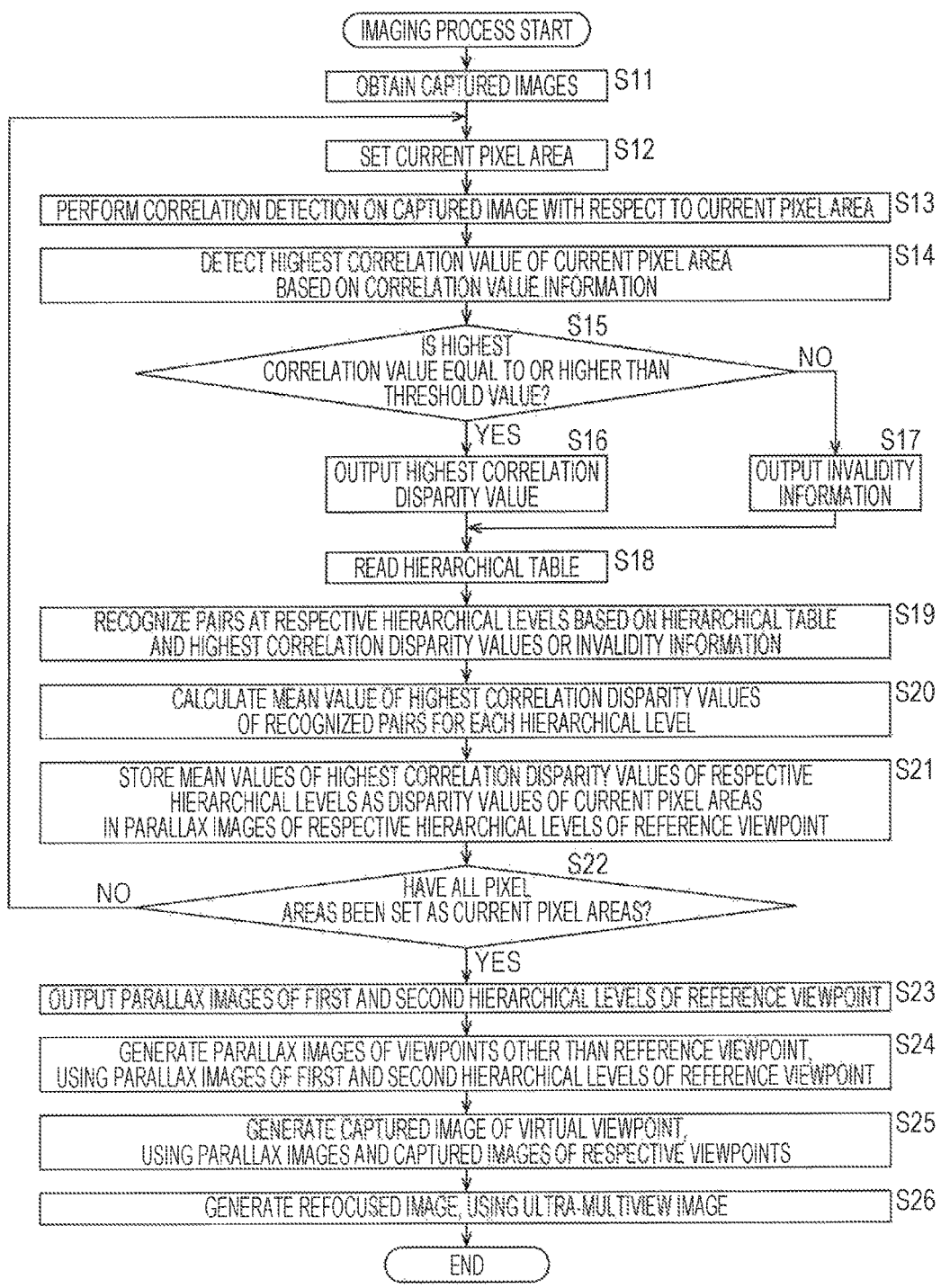
FIG. 21 is a flowchart for explaining an imaging process.

FIG. 21 is a flowchart for explaining an imaging process to be performed by the imaging apparatus 10 shown in FIG. 1.

In step S11 in FIG. 21, the imaging array 12 of the imaging apparatus 10 obtains captured images of the respective viewpoints of the imaging units 41-0 through 41-8, and supplies the captured images to the detecting unit 21. In step 312, the correlation generating unit 61 (FIG. 3) of the detecting unit 21 sets the pixel area of the captured image of the reference viewpoint as the current pixel area.

Specifically, in the captured image of the reference viewpoint, the correlation generating unit 61 shifts the pixel area of a predetermined size from the upper left portion by the amount equivalent to one pixel at a time in the raster scanning direction, and thus sets the pixel area of the predetermined size. The correlation generating unit 61 sets the upper-left pixel area as the current pixel area in the first procedure in step S12, and sets the pixel area in the order of raster scanning in the later procedures in step S12.

In step S13, the correlation generating unit 61 performs correlation detection on the captured image with respect to the current pixel area, and generates correlation value information. The correlation generating unit 61 then supplies the correlation value information to the high-correlation detecting unit 62.

In step S14, the high-correlation detecting unit 62 detects the highest correlation value in the current pixel area based on the correlation value information supplied from the correlation generating unit 61. In step S15, the high-correlation detecting unit 62 determines whether the detected highest correlation value is equal to or higher than the threshold value.

If the highest correlation value is determined to be equal to or higher than the threshold value in step S15, the high-correlation detecting unit 62 in step S16 outputs the highest correlation disparity value to the generating unit 63, and the process then moves on to step S18.

If the highest correlation value is determined not to be equal to or higher than the threshold value in step S15, the high-correlation detecting unit 62 in step S17 outputs invalidity information to the generating unit 63, and the process then moves on to step S18.

In step S18, the generating unit 63 reads the hierarchical table from the database 64. In step S19, the generating unit 63 recognizes the pairs at the respective hierarchical levels based on the hierarchical table and on the highest correlation disparity values or the invalidity information supplied from each high-correlation detecting unit 62.

In step S20, the generating unit 63 calculates the mean value of the highest correlation disparity values of the pairs recognized in step S19 for each hierarchical level. In step S21, the generating unit 63 stores the mean values of the highest correlation disparity values of the respective hierarchical levels calculated in step S20 as the disparity values of the current pixel areas in the parallax images of the respective hierarchical levels of the reference viewpoint.

In step S22, the correlation generating unit 61 determines whether all the pixel areas have been set as the current pixel areas. If it is determined in step S22 that not all the pixel areas have been set as the current pixel areas, the process returns to step 312, and the procedures of steps S12 through 322 are repeated until all the pixels areas have been set as the current pixel area.

If it is determined in step S22 that all the pixel areas have been set as the current pixel areas, on the other hand, the generating unit 63 in step S23 outputs the stored parallax images of the first hierarchical level and the second hierarchical level of the reference viewpoint to the virtual-viewpoint image generating unit 22.

In step S24, using the parallax images of the first hierarchical level and the second hierarchical level of the reference viewpoint supplied from the generating unit 63, the virtual-viewpoint image generating unit 22 generates parallax images of viewpoints other than the reference viewpoint.

In step S25, the virtual-viewpoint image generating unit 22 generates a captured image of a virtual viewpoint, using the parallax images of the respective viewpoints and the captured images of the respective viewpoints supplied from the imaging array 12. The virtual-viewpoint image generating unit 22 supplies the captured images of the respective viewpoints supplied from the imaging array 12 and the captured image of the virtual viewpoint as an ultra-multiview image to the refocused image generating unit 23.

In step S26, the refocused image generating unit 23 generates a captured image of a virtual focus as a refocused image, using the ultra-multiview image supplied from the virtual-viewpoint image generating unit 22. The refocused image generating unit 23 outputs the generated refocused image.

In the above manner, the imaging apparatus 10 generates a parallax image formed with the disparity value of the reference viewpoint as the parallax image of the first hierarchical level, and generates a parallax image formed with the disparity value of the occlusion region of the reference viewpoint as the parallax image of the second hierarchical level. Accordingly, the parallax images of viewpoints other than the reference viewpoint can be accurately generated.

The imaging apparatus 10 also generates the parallax images of viewpoints other than the reference viewpoint, from the parallax image of the reference viewpoint. Accordingly, the amount of calculation required for generating the parallax images of the respective viewpoints is smaller than that in a case where the parallax images of the respective viewpoints are generated from captured images. Also, only the parallax image of the reference viewpoint needs to be stored for the use in the later process using the parallax images of the respective viewpoints. Accordingly, the number of parallax images that need to be stored is small. In a case where the parallax images of the respective viewpoints are generated from captured images, on the other hand, the parallax images of all the viewpoints need to be stored.

Furthermore, the imaging apparatus 10 stores the parallax image formed with the disparity value of the reference viewpoint and the parallax image formed with the disparity value of the occlusion region of the reference viewpoint in a hierarchical manner. Accordingly, the disparity value of the reference viewpoint and the disparity value of the occlusion region of the reference viewpoint can be stored with high efficiency. The imaging apparatus 10 can also readily and accurately select the highest correlation disparity values to be used in generating a parallax image based on the hierarchical table.

(Another Example Structure of the Imaging Array)

Figure 22:
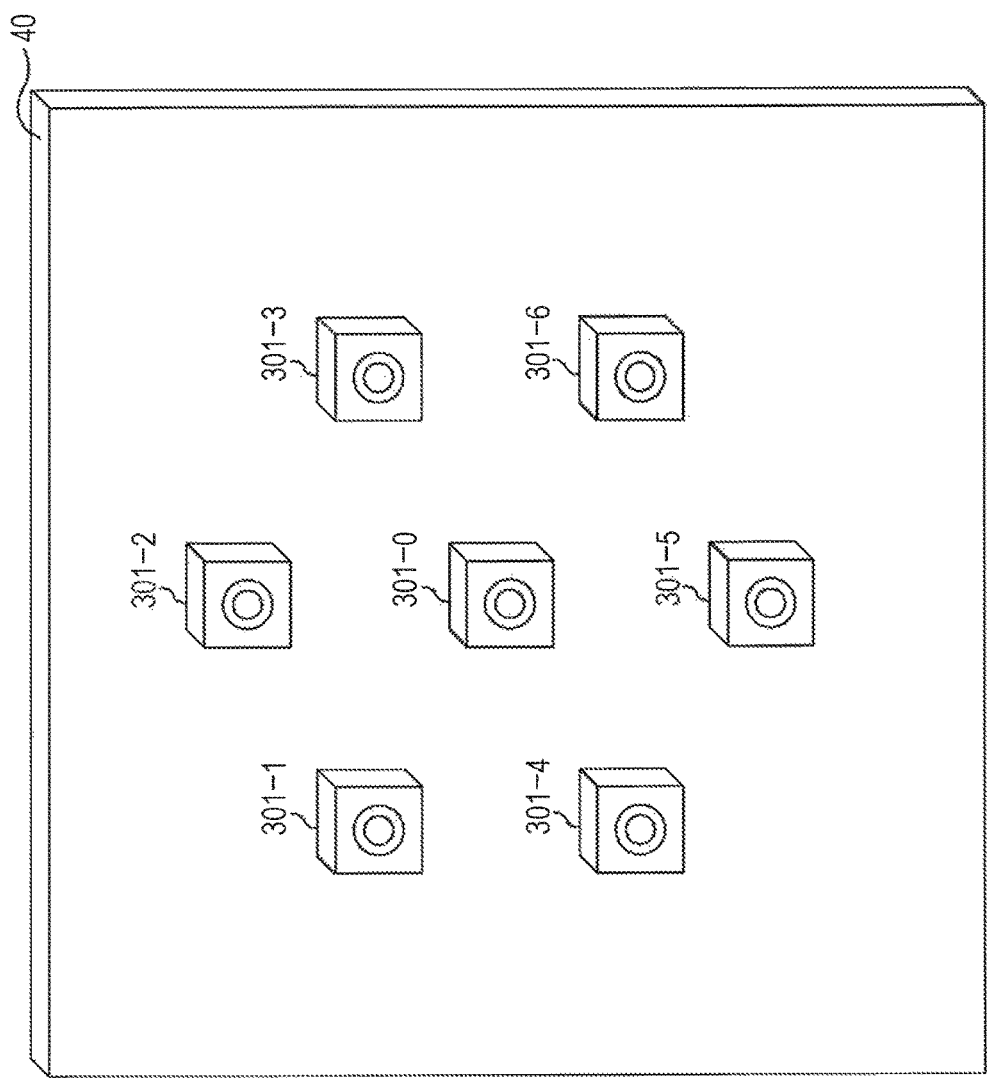
FIG. 22 is a perspective view of another example structure of the imaging array.

FIG. 22 is a diagram showing another example structure of the imaging array 12 shown in FIG. 1, and is a perspective view of the imaging array 12 as seen from the object side.

In the imaging array 12 shown in FIG. 22, seven imaging units 301-0 through 301-6 are arranged on a flat board surface 40 so that the imaging units 301-1 through 301-6 are located at the corners of a regular hexagon having the imaging unit 301-0 located at its center.

In the example shown in FIG. 22, the imaging units 301-1 through 301-6 are located at the corners of a regular hexagon. However, the imaging units 301-1 through 301-6 may be located at the corners of a hexagon. That is, the distances between adjacent imaging units among the imaging units 301-1 through 301-6 may not be the same.

Also, the number and the positions of the imaging units constituting the imaging array 12 are not limited to those of the examples shown in FIGS. 2 and 22.

For ease of explanation, there is only one occlusion region of the reference viewpoint in this embodiment. However, there may be more than one occlusion region. That is, a captured image may be an image showing objects in front of a background. In such a case, the number of hierarchical levels of the parallax image of the reference viewpoint is the number obtained by adding "1" to the number of occlusion regions.

(Explanation of a Computer to which the Present Disclosure is Applied)

The above described series of processes can be performed by hardware as described above, but can also be performed by software. When the series of processes are to be performed by software, the program that forms the software is installed into a computer. Here, the computer may be a computer incorporated into special-purpose hardware, or may be a general-purpose personal computer that can execute various kinds of functions as various kinds of programs are installed thereinto.

Figure 23:
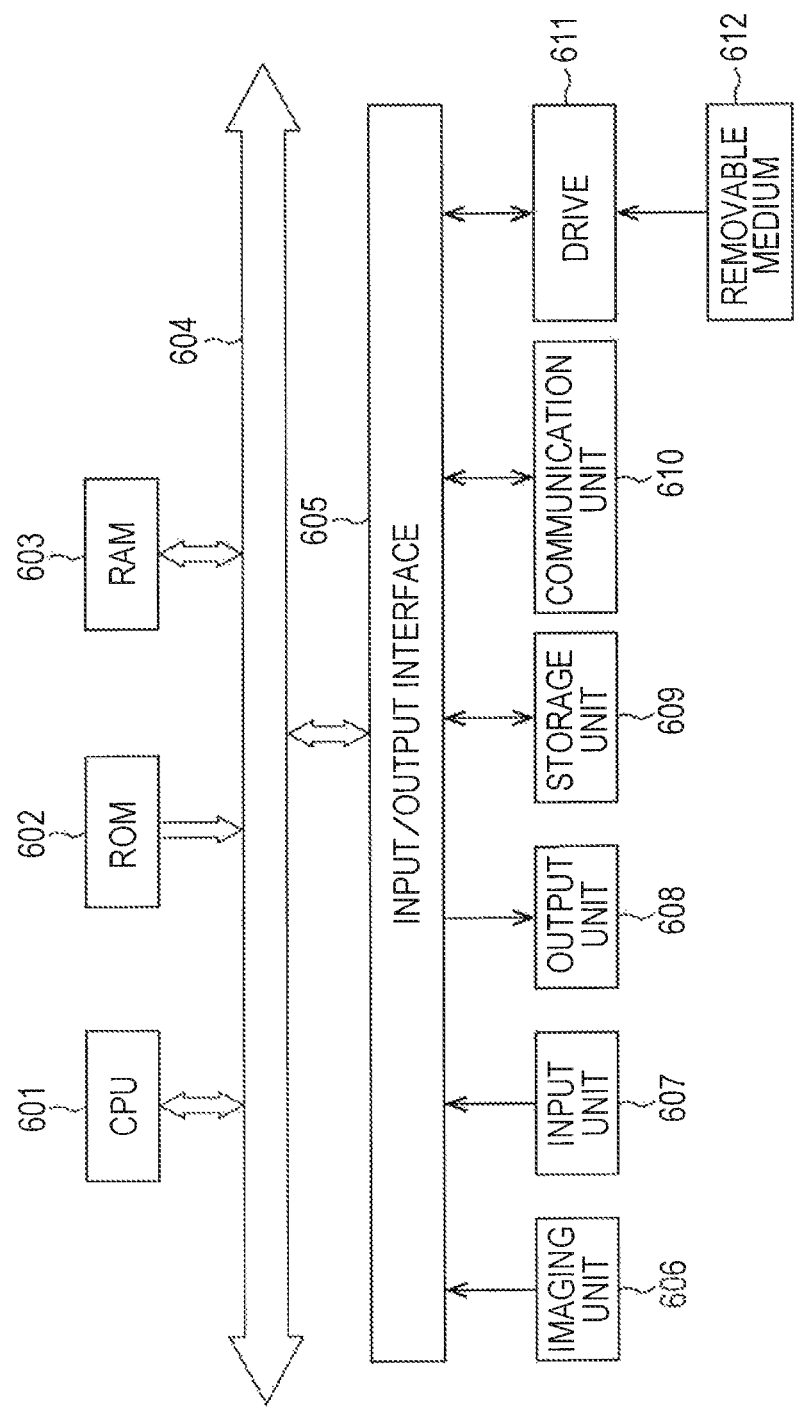
FIG. 23 is a block diagram showing an example configuration of the hardware of a computer.

FIG. 23 is a block diagram showing an example configuration of the hardware of a computer that performs the above described series of processes in accordance with a program.

In the computer, a CPU (Central Processing Unit) 601, a ROM (Read Only Memory) 602, and a RAM (Random Access Memory) 603 are connected to one another by a bus 604.

An input/output interface 605 is further connected to the bus 604. An imaging unit 606, an input unit 607, an output unit 608, a storage unit 609, a communication unit 610, and a drive 611 are connected to the input/output interface 605.

The imaging unit 606 is formed with the imaging array 12 or the like, and obtains captured images of different viewpoints. The input unit 607 is formed with a keyboard, a mouse, a microphone, and the like. The output unit 608 is formed with a display, a speaker, and the like. The storage unit 609 is formed with a hard disk, a nonvolatile memory, or the like. The communication unit 610 is formed with a network interface or the like. The drive 611 drives a removable medium 612 such as a magnetic disk, an optical disk, a magnetooptical disk, or a semiconductor memory.

In the computer having the above described structure, the CPU 601 loads a program stored in the storage unit 609 into the RAM 603 via the input/output interface 605 and the bus 604, for example, and executes the program, so that the above described series of processes are performed.

The program to be executed by the computer (the CPU 601) may be recorded on the removable medium 612 as a packaged medium to be provided, for example. Alternatively, the program can be provided via a wired or wireless transmission medium such as a local area network, the Internet, or digital satellite broadcasting.

In the computer, the program can be installed into the storage unit 609 via the input/output interface 605 when the removable medium 612 is mounted on the drive 611. The program can also be received by the communication unit 610 via a wired or wireless transmission medium, and be installed into the storage unit 609. Alternatively, the program may be installed beforehand into the ROM 602 or the storage unit 609.

The program to be executed by the computer may be a program for performing processes in chronological order in accordance with the sequence described in this specification, or may be a program for performing processes in parallel or performing a process when necessary, such as when there is a call.

It should be noted that embodiments of the present disclosure are not limited to the above described embodiment, and various modifications may be made to the above embodiment without departing from the scope of the present disclosure.

For example, an image other than a refocused image (such as an image with different lighting from that of captured images) may be generated with the use of an ultra-multiview image.

The disparity value of the reference viewpoint and the disparity value of the occlusion region of the reference viewpoint may be values based on highest correlation disparity values other than the mean values of the highest correlation disparity values of the pairs corresponding to the respective hierarchical levels (such as the largest values of the highest correlation disparity values).

Further, the imaging apparatus 10 may not store the hierarchical table. In such a case, if there is only one type of highest correlation disparity value, the highest correlation disparity value is set as the disparity value of the reference viewpoint. If there are two or more types of highest correlation disparity values, on the other hand, the highest correlation disparity value of the pairs with the reference viewpoint is set as the disparity value of the reference viewpoint, and the highest correlation disparity value on the farther side of the highest correlation disparity value is set as the disparity value of the occlusion region of the reference viewpoint.

The number of pairs of captured images to be subjected to correlation detection is 16 in the above described embodiment, but may not be 16. In a case where a method of detecting a correlation value from contrast is employed as the correlation detection method, a correlation value among three or more captured images may be generated.

Furthermore, the present technology can be applied not only to an imaging apparatus that obtains captured images of a large number of viewpoints through imaging units, but also to an imaging apparatus that obtains captured images of a large number of viewpoints through an imaging lens and a microlens array.

The present disclosure may also be embodied in the structures described below.

(1)
An image processing apparatus including:
a calculating unit that calculates correlation values of captured images of a plurality of pairs of viewpoints, using captured images of the viewpoints; and
a generating unit that generates parallax images of different hierarchical levels of a reference viewpoint based on the correlation values calculated by the calculating unit, the parallax images being a viewpoint parallax image formed with the disparity value of the reference viewpoint and an occlusion parallax image formed with the disparity value of an occlusion region, the reference viewpoint being one of the viewpoints.

(2)
The image processing apparatus of (1), wherein the generating unit generates the viewpoint parallax image and the occlusion parallax image based on the highest correlation disparity value as the disparity value corresponding to the highest one of the correlation values.

(3)
The image processing apparatus of (2), wherein the generating unit generates the viewpoint parallax image based on the highest correlation disparity value of a first pair among the pairs of viewpoints, and generates the occlusion parallax image based on the highest correlation disparity value of a second pair, the second pair being different from the first pair among the pairs of viewpoints.

(4)
The image processing apparatus of (3), wherein the generating unit uses the mean value of the highest correlation disparity values of a plurality of first pairs as the disparity value of the viewpoint parallax image, and uses the mean value of the highest correlation disparity values of a plurality of second pairs as the disparity value of the occlusion parallax image, each of the first pairs being the first pair, each of the second pairs being the second pair.

(5)
The image processing apparatus of (3) or (4), wherein the generating unit generates the viewpoint parallax image and the occlusion parallax image based on a table associating a pattern of the correlation values of the respective pairs with the first pair and the second pair.

(6)
The image processing apparatus of one of (1) through (5), further including
a virtual-viewpoint image generating unit that generates a captured image of a virtual viewpoint based on the captured images of the viewpoints and the parallax images of the reference viewpoint generated by the generating unit.

(7)
The image processing apparatus of (6), further including
a virtual-focus image generating unit that generates a captured image of a virtual focus, using the captured image of the virtual viewpoint generated by the virtual-viewpoint image generating unit and the captured images of the viewpoints.

(8)
An image processing method including:
a calculation step of calculating correlation values of captured images of a plurality of pairs of viewpoints, using captured images of the viewpoints; and
a generation step of generating parallax images of different hierarchical levels of a reference viewpoint based on the correlation values calculated in the calculation step, the parallax images being a viewpoint parallax image formed with the disparity value of the reference viewpoint and an occlusion parallax image formed with the disparity value of an occlusion region, the reference viewpoint being one of the viewpoints,
the calculation step and the generation step being carried out by an image processing apparatus.

(9)
An image processing apparatus including:
a calculating unit that calculates correlation values of captured images of a plurality of pairs of viewpoints, using captured images of the viewpoints; and
a generating unit that generates a viewpoint parallax image based on a table associating a pattern of the correlation values of the respective pairs with a predetermined pair among the pairs of viewpoints, the viewpoint parallax image being generated from the highest correlation disparity value as the disparity value corresponding to the highest correlation value of the predetermined pair, the viewpoint parallax image being formed with the disparity value of a reference viewpoint, the reference viewpoint being one of the viewpoints.

(10)
An image processing method including:
a calculation step of calculating correlation values of captured images of a plurality of pairs of viewpoints, using captured images of the viewpoints; and
a generation step of generating a viewpoint parallax image based on a table associating a pattern of the correlation values of the respective pairs with a predetermined pair among the pairs of viewpoints, the viewpoint parallax image being generated from the highest correlation disparity value as the disparity value corresponding to the highest correlation value of the predetermined pair, the viewpoint parallax image being formed with the disparity value of a reference viewpoint, the reference viewpoint being one of the viewpoints,
the calculation step and the generation step being carried out by an image processing apparatus.

REFERENCE SIGNS LIST

10 Imaging apparatus
13 Image processing unit
21 Detecting unit
22 Virtual-viewpoint image generating unit
23 Refocused image generating unit
61-1 through 61-16 Correlation generating unit
63 Generating unit

The invention claimed is:
1. An image processing apparatus comprising:
a calculating unit configured to calculate correlation values of captured images of a plurality of pairs of viewpoints, each pair being formed between respective viewpoints of a plurality of viewpoints using captured images of the respective viewpoints obtained by an imaging array including each viewpoint of the plurality of viewpoints; and
a generating unit configured to generate a plurality of parallax images of different hierarchical levels of a reference viewpoint based on highest correlation disparity values among the plurality of pairs of viewpoints using the correlation values calculated by the calculating unit, the plurality of parallax images including a viewpoint parallax image formed with a disparity value of the reference viewpoint and an occlusion parallax image formed with a disparity value of an occlusion region, the reference viewpoint being one of the plurality of viewpoints viewing a region other than the occlusion region, wherein the calculating unit and the generating unit are each implemented via at least one processor.

2. The image processing apparatus according to claim 1, wherein the generating unit generates the viewpoint parallax image based on the highest correlation disparity value of a first pair among the plurality of pairs of viewpoints, and generates the occlusion parallax image based on the highest correlation disparity value of a second pair, the second pair being different from the first pair among the plurality of pairs of viewpoints.

3. The image processing apparatus according to claim 2, wherein the generating unit uses a mean value of the highest correlation disparity values of a plurality of first pairs as the disparity value of the viewpoint parallax image, and uses a mean value of the highest correlation disparity values of a plurality of second pairs as the disparity value of the occlusion parallax image, each of the first pairs being the first pair, each of the second pairs being the second pair.

4. The image processing apparatus according to claim 2, wherein the generating unit generates the viewpoint parallax image and the occlusion parallax image based on a table associating a pattern of the correlation values of the respective pairs with the first pair and the second pair.

5. The image processing apparatus according to claim 1, further comprising:
a virtual-viewpoint image generating unit configured to generate a captured image of a virtual viewpoint based on the captured images of the respective viewpoints and the parallax images of the reference viewpoint generated by the generating unit,
wherein the virtual-viewpoint image generating unit is implemented via at least one processor.

6. The image processing apparatus according to claim 5, further comprising:
a virtual-focus image generating unit configured to generate a captured image of a virtual focus, using the captured image of the virtual viewpoint generated by the virtual-viewpoint image generating unit and the captured images of the respective viewpoints,
wherein the virtual-focus image generating unit is implemented via at least one processor.

7. An image processing method, implemented via a processor, the method comprising:
calculating correlation values of captured images of a plurality of pairs of viewpoints, each pair being formed between respective viewpoints of a plurality of viewpoints using captured images of the viewpoints; and generating a plurality of parallax images of different hierarchical levels of a reference viewpoint based on highest correlation disparity values among the plurality of pairs of viewpoints using the calculated correlation values, the plurality of parallax images including a viewpoint parallax image formed with a disparity value of the reference viewpoint and an occlusion parallax image formed with a disparity value of an occlusion region, the reference viewpoint being one of the plurality of viewpoints viewing a region other than the occlusion region.

8. An image processing apparatus comprising:
a calculating unit configured to calculate correlation values of captured images of a plurality of pairs of viewpoints, each pair being formed between respective viewpoints of a plurality of viewpoints using captured images of the respective viewpoints obtained by an imaging array including each viewpoint of the plurality of viewpoints; and
a generating unit configured to generate a viewpoint parallax image based on a table associating a pattern of the correlation values of respective pairs with a predetermined pair among the plurality of pairs of viewpoints, the viewpoint parallax image being generated from a highest correlation disparity value as a disparity value corresponding to a highest correlation value of the predetermined pair, the viewpoint parallax image being formed with a disparity value of a reference viewpoint, the reference viewpoint being one of the plurality of viewpoints,
wherein the calculating unit and the generating unit are each implemented via at least one processor.

9. An image processing method, implemented via a processor, the method comprising:
calculating correlation values of captured images of a plurality of pairs of viewpoints, each pair being formed between respective viewpoints of a plurality of viewpoints using captured images of the respective viewpoints obtained by an imaging array including each viewpoint of the plurality of viewpoints; and
generating a viewpoint parallax image based on a table associating a pattern of the correlation values of respective pairs with a predetermined pair among the pairs of viewpoints, the viewpoint parallax image being generated from a highest correlation disparity value as the disparity value corresponding to the highest correlation value of the predetermined pair, the viewpoint parallax image being formed with a disparity value of a reference viewpoint, the reference viewpoint being one of the plurality of viewpoints.

* * * * *